United States Patent [19]

Beernink et al.

[11] Patent Number: 5,682,439

[45] Date of Patent: Oct. 28, 1997

[54] BOXED INPUT CORRECTION SYSTEM AND METHOD FOR PEN BASED COMPUTER SYSTEMS

[75] Inventors: Ernest H. Beernink; Stephen P. Capps, both of San Carlos, Calif.

[73] Assignee: Apple Computer, Inc., Cupertino, Calif.

[21] Appl. No.: 512,209

[22] Filed: Aug. 7, 1995

[51] Int. Cl.$^6$ .................................................. G06K 9/00
[52] U.S. Cl. .................................. 382/187; 395/795
[58] Field of Search ................................. 382/187, 188, 382/189, 231, 229, 310, 311; 395/155, 157, 792, 795, 804

[56] References Cited

U.S. PATENT DOCUMENTS

| | | | |
|---|---|---|---|
| 4,953,225 | 8/1990 | Togawa et al. | 382/179 |
| 4,972,496 | 11/1990 | Sklarew | 382/187 |
| 5,347,477 | 9/1994 | Lee | 364/709.11 |
| 5,367,453 | 11/1994 | Capps et al. | 382/310 |
| 5,471,578 | 11/1995 | Moran et al. | 395/161 |
| 5,500,937 | 3/1996 | Thompson-Rohrlich | 395/161 |
| 5,509,114 | 4/1996 | Moran et al. | 395/143 |
| 5,511,135 | 4/1996 | Rhyne et al. | 382/311 |
| 5,513,309 | 4/1996 | Meier et al. | 395/155 |
| 5,528,743 | 6/1996 | Tou et al. | 395/148 |

*Primary Examiner*—Leo Boudreau
*Assistant Examiner*—Jayanti K. Patel

*Attorney, Agent, or Firm*—Hickman Beyer & Weaver

[57] ABSTRACT

According to the present invention, a variety of correction methods and systems are disclosed. A first method aspect of the present invention teaches a computer implemented correction method for correcting words and characters entered into a pointer based computer system. The correction method includes the step of receiving a selected word including at least one character, displaying the selected word within a boxed input corrector implemented on the pointer based computer system; receiving a correction input and performing an action indicated by the correction input. The action is determined by a type of the correction input, the types of correction inputs including character editing input, gesture input, navigation input, and external input generated by events external to the boxed input corrector. One embodiment of the present invention teaches a boxed input correction system comprising a pen-based computer system including a central processing unit, memory accessible by the central processing unit, and a dual-function display system having a display screen. The boxed input correction system also includes a boxed input corrector which receives and displays a selected word, receives a correction input indicating an action to be performed on the selected word, and performs the action. When the selected word is an ink word, the boxed input corrector displays the ink word centered within a single box and, when the selected word is a string of one or more well defined characters, the boxed input corrector displays the selected word such that each well defined character has a box associated therewith.

38 Claims, 18 Drawing Sheets

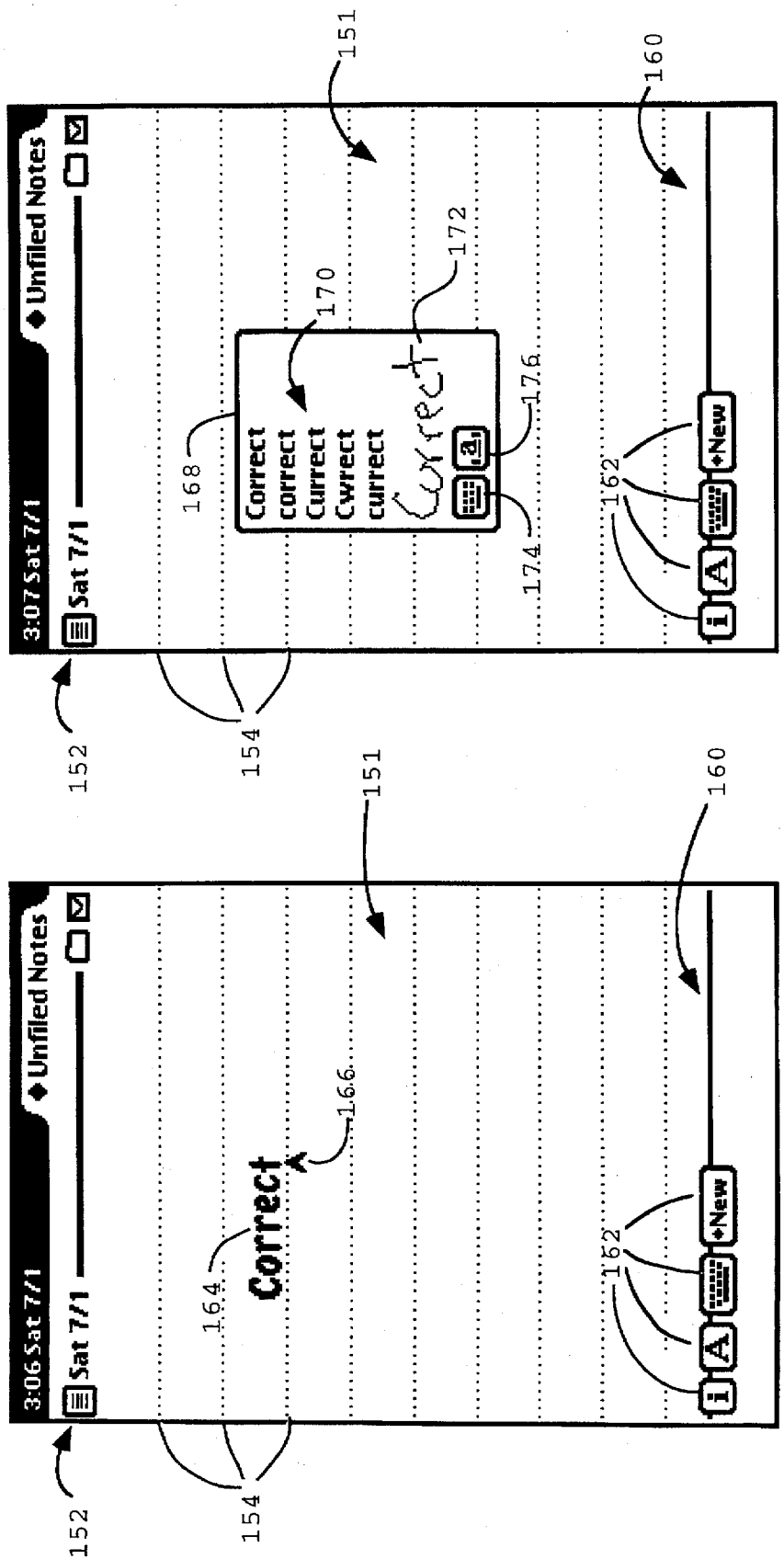

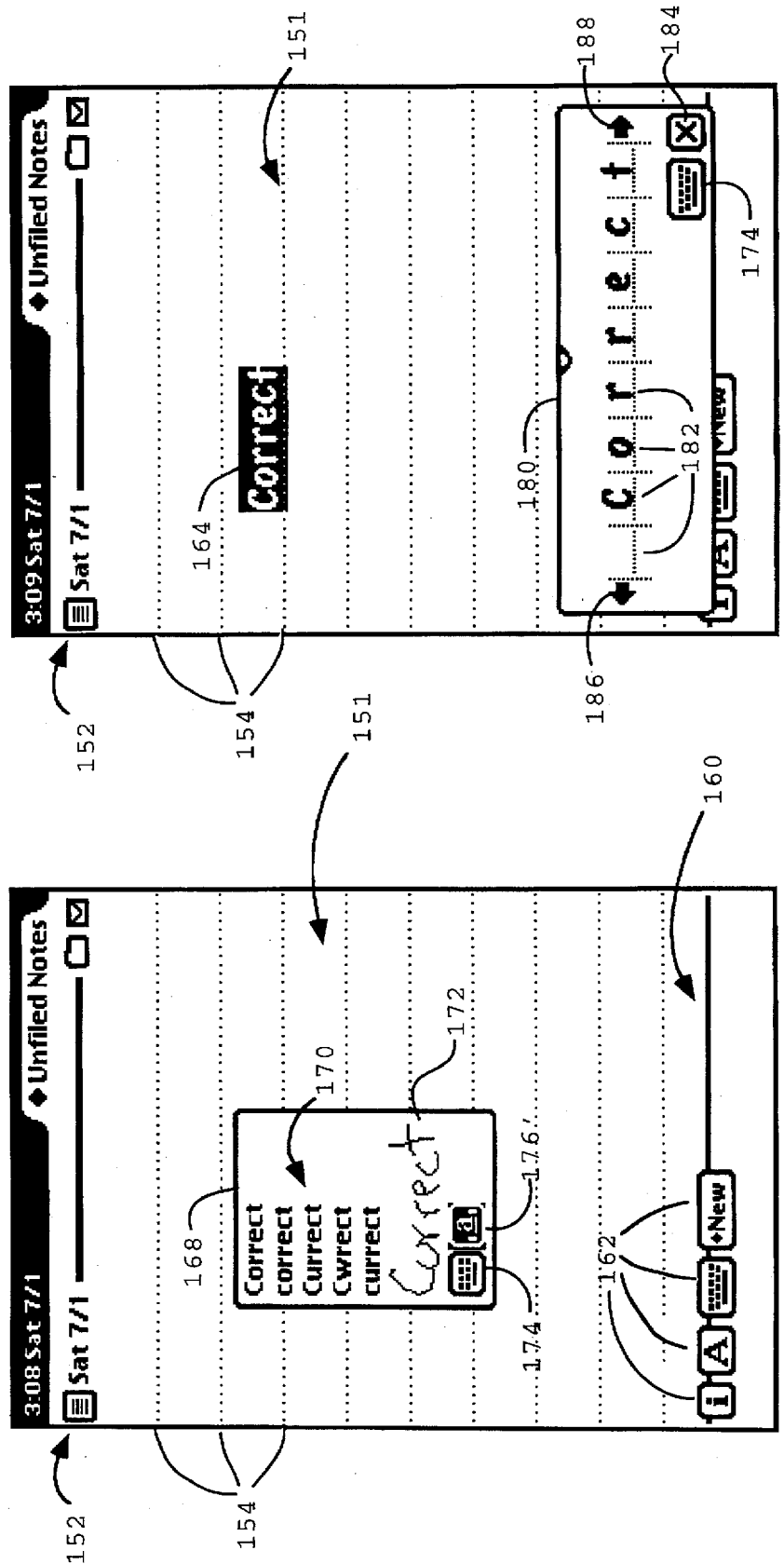

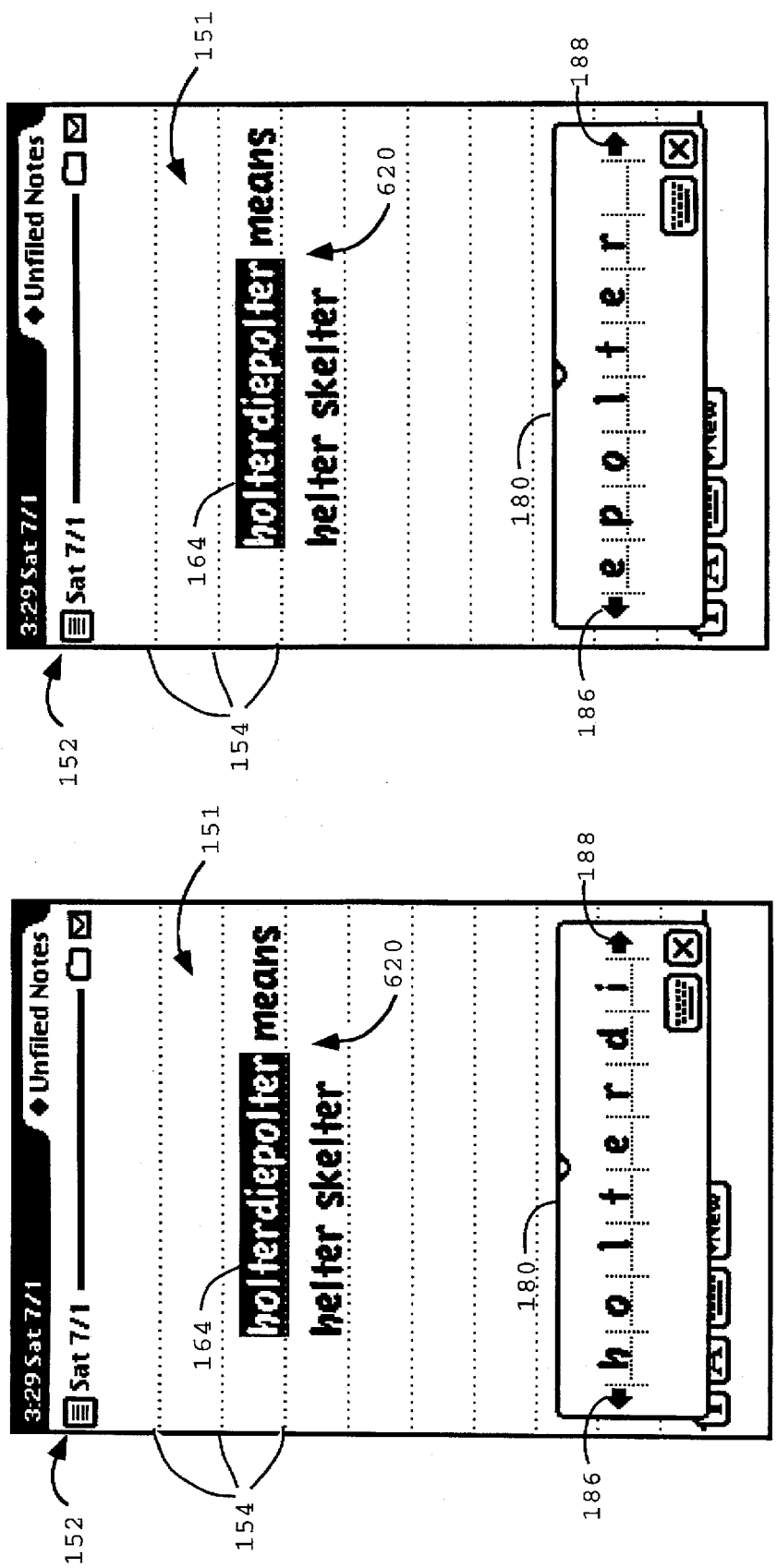

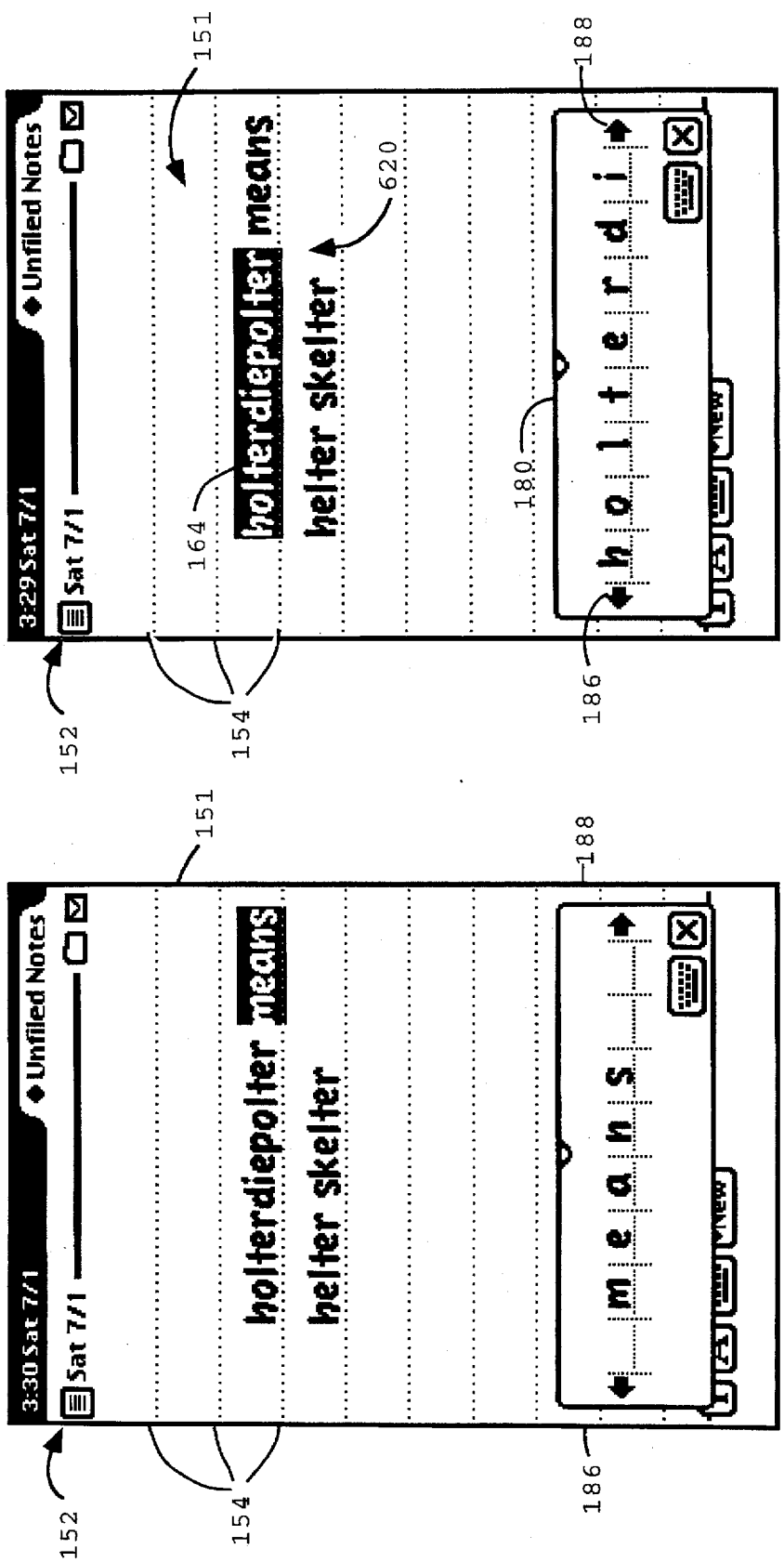

BOXED INPUT CORRECTION SYSTEM AND METHOD FOR PEN BASED COMPUTER SYSTEMS

BACKGROUND OF THE INVENTION

The present invention relates generally to computer systems, and more particularly to a boxed input correction system and method for pen-based computer systems.

Computers are becoming increasingly powerful, lightweight, and portable. The computing power of computers that once filled entire rooms is now residing on a desktop. Laptop, notebook, and sub-notebook computers are virtually as powerful as their desktop counterparts. Even smaller hand-held computers are now capable of computing tasks that required a much larger machine a few short years ago.

As a part of this trend, computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from many companies including Sharp and Casio of Japan.

A relatively new form of computer, the pen-based computer system, holds forth the promise of a marriage of the power of a general purpose computer with the functionality and small size of a personal organizer. An example of a pen-based computer system is the Newton® 120 pen-based computer made and marketed by Apple Computer, Inc. of Cupertino, Calif.

A pen-based computer system is typically a small, hand-held computer where the primary method for inputting data includes a "pen" or stylus. A pen-based computer system is commonly housed in a generally rectangular enclosure, and is provided with a dual-function display assembly that can serve as both an input device and an output device. When operating as an input device or "tablet", the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad, among other functions. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. By "ink" it is meant that pixels on the screen are activated in such a manner that it appears that the stylus is leaving a trail of ink on the display assembly. With suitable recognition software, the "ink" can be recognized to input text, numerics, graphics, and other recognized information into the pen-based system.

In an ideal scenario, recognition software consistently recognizes the input text, numerics, graphics, and other information with one-hundred percent accuracy. Unfortunately, even though progress is being made, ideal recognition software is not currently available. Furthermore, because of the inherent variability of handwriting, "perfect" recognition software may perhaps never be realizable. Regardless of the barriers which currently preclude an implementation of ideal recognition software (especially within hand-held computer systems), there is still a need for pen-based computer systems which implement the imperfect recognition software. However, in order to compensate for imperfect recognition software, some sort of correction system must be provided within the pen-based computer system. The correction system should allow the user to easily select and modify words that the recognition software has incorrectly recognized. Furthermore, the correction system must adhere to the natural requirements of pen-based computer systems. In particular, the correction system must be operable via a pointing device yet utilize a relatively small display area.

SUMMARY OF THE INVENTION

In order to achieve the foregoing, and in accordance with the objectives of the present invention, a variety of methods and systems are disclosed. A first method aspect of the present invention teaches a computer implemented correction method for correcting words and characters entered into a pointer based computer system. The correction method includes the step of receiving a selected word including at least one character. The selected word may take on one of a variety of forms including an ink word and a string of one or more well defined characters. The method further includes the step of displaying the selected word within a boxed input corrector displayed on a display screen of the pointer based computer system. When the selected word is the ink word, it is displayed centered in the boxed input corrector within a single box. However, when the selected word is the string of one or more well defined characters it is arranged within the boxed input corrector such that each well defined character has a box associated therewith. Furthermore, when a given character of the selected word is displayed, the given character is displayed within its associated box.

The correction method further includes the steps of receiving a correction input and performing an action indicated by the correction input. The action is determined by a type of the correction input; the types of correction inputs include character editing input, gesture input, navigation input, and external input generated by events external to the boxed input corrector.

In a number of related aspects of the present invention, a variety of correction methods for processing character editing input, gesture input, navigation input and external input are disclosed. One aspect teaches a correction method for when the selected word is the string of one or more well defined characters and the correction input is a character editing input overwriting a given box. This correction method includes the steps of receiving a ranked character list of one or more well defined characters corresponding to possible characters which the character editing input may represent, reordering the ranked character list based on a format of the boxed input corrector and a guess list of characters which the box input corrector has previously suggested for the given box, removing any characters from the ranked character list which are not suitable for the given box, and replacing a current character associated with the given box with a highest ranked character found in the ranked character list.

Another aspect of the present invention teaches that when the correction input is a scrub gesture input and the selected word is the ink word, the step of performing the action includes the step of deleting the ink word. However, when the selected word is the string of one or more well defined characters, the present invention teaches determining a bounds of the scrub gesture input, determining the boxes which the bounds of the scrub gesture input overlap, selecting each character which is fully covered by the bounds of the scrub gesture input, and, when the bounds of the scrub gesture input do not fully cover at least one character, determining if the scrub gesture input is a single character scrub gesture, and, if so, selecting a single character which the bounds of the scrub gesture input overlap.

Still another aspect of the present invention teaches a correction method for when the correction input is an insert gesture input and the selected word is the ink word. In this aspect, the correction method includes forming two new ink words by splitting the ink word at an input position of the insert gesture input and setting the selected word to a one of the two new ink words.

When the correction input is an insert gesture input, the selected word is the string of one or more well defined characters, and the selected word is not displayed in a fixed format, the present invention teaches that the step of performing the action includes the step of adding a space character at an input position of the insert gesture input. However, if the selected word is displayed in a fixed format, then the insert gesture input is ignored, as there is no space for inserting characters.

One embodiment of the present invention teaches a boxed input correction system. The boxed input correction system comprises a pen-based computer system including a central processing unit, memory accessible by the central processing unit, and a dual-function display system having a display screen. Furthermore, the boxed input correction system includes a boxed input corrector implemented on the pen-based computer system which receives and displays a selected word, receives a correction input indicating an action to be performed on the selected word, and performs the action. The boxed input corrector is operable such that when the selected word is an ink word, the boxed input corrector displays the ink word centered within a single box. On the other hand, when the selected word is a string of one or more well defined characters, the boxed input corrector displays the selected word such that each well defined character has a box associated therewith and when a given character of the selected word is displayed the given character is displayed within its associated box.

These and other advantages of the present invention will become apparent upon reading the following detailed descriptions and studying the various figures of the drawings.

BRIEF DESCRIPTION OF THE DRAWINGS

FIG. 4 is a computer screen display illustrating a note area of a pen-based computing system having a word which may be selected;

FIG. 5 is a computer screen display illustrating a pop-up corrector invoked for the selected word of FIG. 4;

FIG. 6 is a computer screen display illustrating the selection of a boxed input corrector in accordance with one embodiment of the present invention;

FIG. 7 is a computer screen display illustrating a boxed input corrector invoked for the selected word of FIG. 5 in accordance with one embodiment of the present invention;

FIGS. 22–25 are computer screen displays illustrating a few examples of a boxed input corrector navigating through a text paragraph in accordance with one embodiment of the present invention.

DETAILED DESCRIPTION OF THE PREFERRED EMBODIMENTS

The present invention is well suited for pointer based computer systems such as the pen-based, pen-aware, mouse, track ball, and track pad controlled systems that are currently popular. For the purposes of illustration, the invention will be described in connection with a pen-based system.

Figure 1:
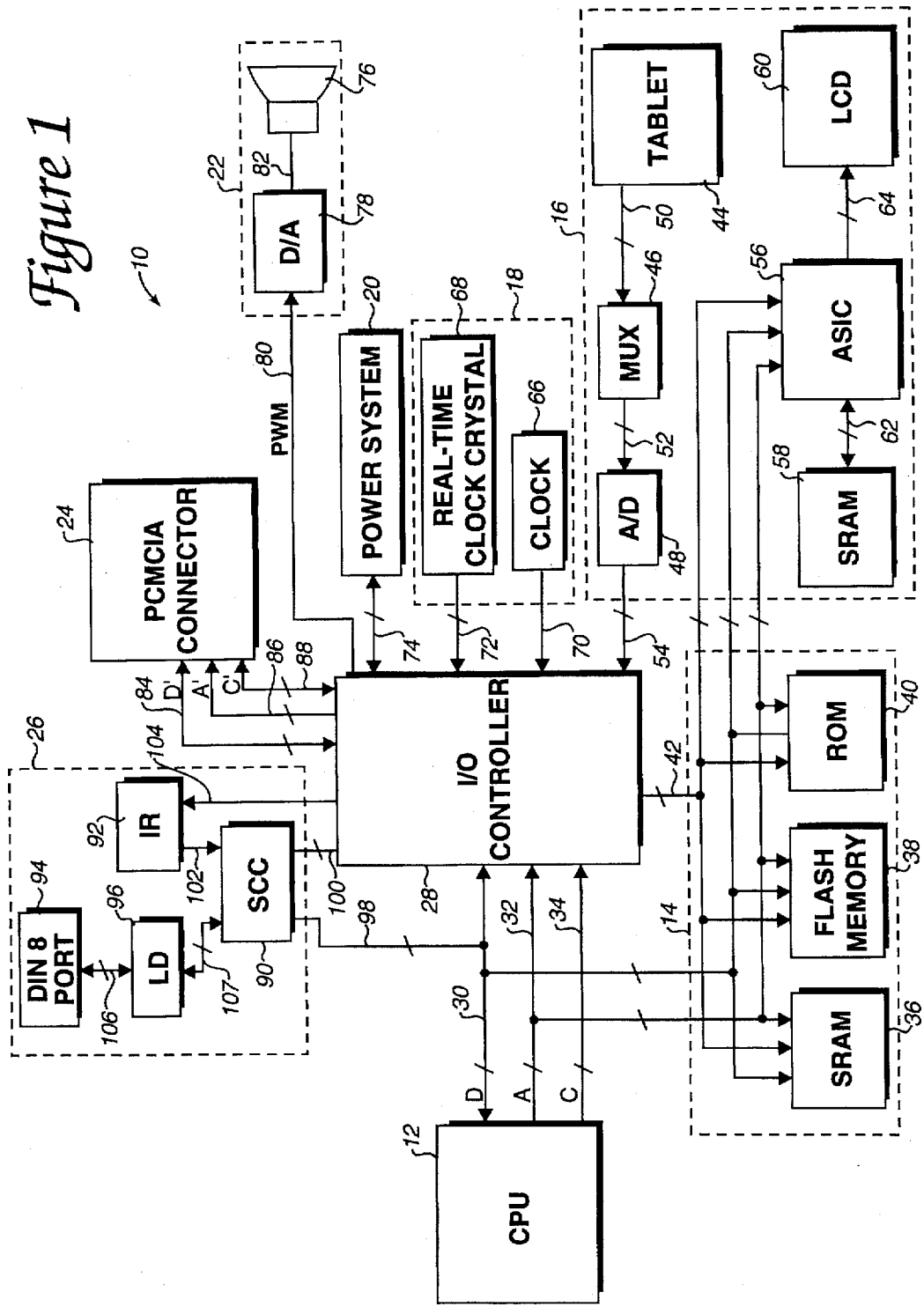
FIG. 1 is a block diagram of the electronics of a pen-based computer system in accordance with the present invention.

As shown in FIG. 1, a block diagram 10 of the electronics of a pen-based computer in accordance with the present invention includes a central processing unit (CPU) 12, a memory system 14, an input/output (I/O) dual function display system 16, a clock system 18, a power system 20, a sound system 22, a PCMCIA connector 24, and a serial I/O system 26. The various components and systems of the computer 10 are coupled together by an I/O controller 28 which serves as an interface between the CPU 12 and other components of the computer 10. More specifically, the I/O controller 28 is an application-specific integrated circuit (ASIC) designed to handle memory, peripherals, and I/O tasks, as well as housekeeping functions such as providing system clocks, controlling power usage, etc. The design, manufacture, and use of ASICs is well known to those skilled in the art. The pen-based computer 10 as illustrated is currently being manufactured and sold by Apple Computer, Inc. of Cupertino, Calif. as a Newton® 120 Personal Digital Assistant (PDA).

CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. In the present embodiment, the CPU 12 is preferably an ARM® 610 RISC chip operating at 20 megahertz and is available from a variety of sources including VLSI Technology, Inc. of San Jose, Calif. and Plessey Semiconductor of England. The present CPU 12 includes a 32 bit data (D) bus 30, a 32 bit address (A) bus 32, and an 8 bit control (C) bus 34.

The memory system 14 includes static random access memory (SRAM) 36, non-volatile read/write "flash" memory 38, and ROM 40. The SRAM 36 serves as volatile "scratch pad" memory for the computer system 10 and, in the current system, includes 512 kilobytes of memory. The flash memory 38 is where user data is stored, preferably includes about 2 megabytes of memory, and is available as a standard product from Intel Corporation of Santa Clara, Calif. The ROM 40 stores the operating system and embedded application programs, and currently comprises approximately 8 megabytes of memory. Of course, there are many equivalents for the SRAM 36, flash memory 38, and ROM 40. For example, dynamic random access memory (DRAM) can be substituted for SRAM 36, battery-backed random accessed memory (RAM) can be substituted for flash memory 38, and a programmable read-only memory (PROM) can be substituted for the ROM 40.

The memory system 14 is coupled directly to the data (D) bus 30 and the address (A) bus 32. The memory system is also coupled to a memory control bus 42 of controller 28. The CPU 12 and controller 28 cooperate to read and write data to the memory system 14 via the busses 30, 32, and 42.

The I/O display system 16 serves as both an input device and an output device. More particularly, a tablet 44, multiplexer (MUX) 46, and analog-to-digital (A/D) converter 48 convert the contact of a stylus (see FIG. 2) with the tablet 44 and its subsequent movement over the tablet into digital data that is input to controller 28. The tablet 44 is preferably a four-wire resistive membrane tablet and provides positional information on a bus 50 which is input into the MUX 46. The MUX 46 determines which of the four sides of the tablet is to be read. Such tablets are widely available from a variety of sources including Nissha of Japan. An output from the MUX 46 is input to A/D converter 48 on a bus 52. An output from the A/D converter 48 is input into the controller 28.

The display system 16 further includes an ASIC 56, a dedicated SRAM 58, and an LCD screen 60. The ASIC 56 is an LCD controller coupled to the data (D) bus 30, the address. (A) bus 32, and the memory control bus 42. The purpose of the ASIC 56 is to allow the CPU 12 to write to the screen as if it were a RAM sitting on the memory bus 42. The SRAM 58 is coupled to the ASIC 56 by a dedicated bus 62, and the screen 60 is coupled to the ASIC 56 by a dedicated bus 64. The ASIC 56 serves as a controller for the screen 60, and uses the SRAM 58 as a frame buffer to store images to be displayed on the screen 60. The LCD screen 60 is preferably a standard super-twist LCD matrix screen available from a number of sources including Seiko-Epson of Japan. The LCD screen preferably comprises a rectangular array of picture elements or "pixels", as is well known to those skilled in the art.

The clock system 18 includes a main system clock 66 and a real-time clock (RTC) crystal 68. The main system clock is a four-terminal oscillator and is used to provide the master clock for the computer 10. In the present embodiment, the main system clock 66 operates, at 40 megahertz. Oscillator clocks such as clock 66 can be commercially obtained from many sources including Seiko-Epson of Japan. This master clock may be divided down by the controller 28 for various timing purposes in the system, and is coupled to the controller 28 by a line 70.

The RTC crystal 68 is tuned to 32.768 kilohertz, which is evenly divisible by a power of 2. The RTC crystal 68 forms the basis of a crystal based oscillator that can provide a continuous, precise, uninterrupted signal at 1 hertz by dividing down the 32.768 kilohertz crystal signal with a 10 bit divider. The circuitry for performing this type of task is well-known, and form a part of controller 28 in this embodiment. The one hertz RTC signal increments a RTC counter (also a part of the controller 28) to count off the total number of seconds that has elapsed since midnight, Jan. 1, 1904. The value in the RTC counter can be converted into time of day and date information by relatively straight-forward calculations well known to those skilled in the art. Since the RTC crystal 68 is coupled to the controller 28 by a dedicated two-line bus 72 to provide the 32.768 kilohertz signal to the controller 28.

The power system 20 provides power to the computer 10 and is coupled to the controller 28 by a dedicated bi-directional bus 74. The bus 74 allows for the handling of fault detection signals (e.g. low power), switching on and off power to the PCMCIA connector 24, etc. The power system 20 preferably operates to conserve power at times of low usage of the pen-based computer system 10.

The sound system 22 includes a small (18 mm diameter) loudspeaker 76 and a D/A converter 78. The D/A converter 78 is coupled to the controller 28 by a line 80, and to the loudspeaker 76 by a line 82. In the present embodiment, the D/A converter 78 is a simple operational amplifier (OP AMP) which acts as an integrator to integrate pulse width modulation (PWM) signals developed on line 80 to provide an analog signal on line 82 to drive loudspeaker 76. Of course, more complex D/A converters can also be used to provide higher quality sound output from loudspeaker 76, as will be apparent to those skilled in the art. Suitable OP AMPS to be used as a D/A converter 78 are readily available on the commercial market, and the miniature loudspeaker is also readily available, such as from Hosiden of Osaka, Japan.

The PCMCIA connector 24 is coupled to the controller 28 by a dedicated data (D') bus 84, a dedicated address (A') bus 86, and a dedicated control (C') bus 88. The PCMCIA specifications for signals on the dedicated data, address, and control busses are industry standard and highly available as the "PC Card" or "PCMCIA" standard. A variety of devices can fit in the PCMCIA slot 24, including memory expansion cards, miniature hard disk drive cards, modem cards, and pager cards, to name a few.

The serial I/O system 26 includes a Serial Communications Controller (SCC) 90, an infrared (IR) transceiver 92, a serial port 94, and a line driver (LD) 96. The SCC 90 is coupled to the data bus (D) 30 by a bus 98 and to the controller 28 by a bus 100. A suitable SCC 90 can be purchased from Zilog Corporation of San Jose, Calif. as part number Z85C30. The Zilog Z85C30 has been available since at least the early 1980's and supports a number of serial protocols. The IR transceiver 92 is coupled to the SCC 90 by a line 102 for received IR signals, and to the controller 28 for IR signals to be transmitted. The IR transceiver 92 includes an IR transmitter (coupled to line 104) and an IR receiver (coupled to line 102), and is available under license from Sharp Corporation of Japan. The IR receiver includes a PIN-type IR-sensitive diode having an output coupled to an analog demodulator and an amplifier to create a signal on line 102, an IR LED coupled to line 104 to be directly driven by a high-power switch of controller 28. The serial port 94 is a standard DIN 8 (8 pin) connector, and is coupled to the line driver LD 96 by an eight bit bus 106. The LD 96 is coupled to the SCC 90 by a bus 107.

Figure 2:
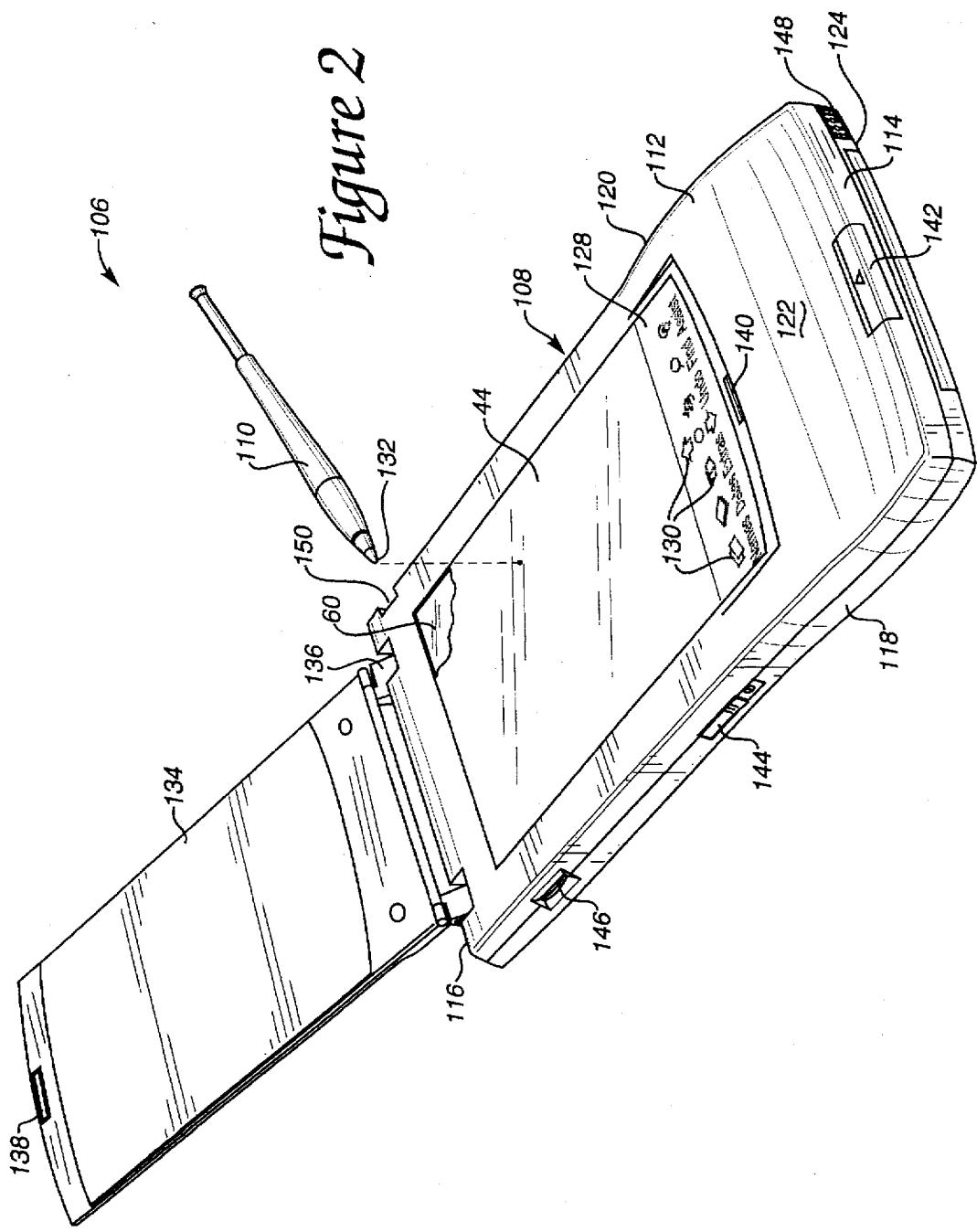
FIG. 2 is a perspective view of a complete pen-based computer system including a housing, display assembly, and stylus, where the electronics of FIG. 1 are enclosed within the housing.

Referring now to FIG. 2, a pen based computer system 106 in accordance with the present invention includes the computer 108 and a pen or stylus 110. The computer 108 is enclosed within a generally flat, rectangular case 112 having a front end 114, a back end 116, a left side 118, a right side 120, a top 122, and a bottom 124. The LCD 60 is positioned along the top 122 of the case 112, and the clear membrane tablet 44 is positioned over the LCD 60. Also positioned beneath the tablet 44 along a lower edge 126 thereof, is a printed strip of material 128 including a number of indicia 130. When the tip 132 of the stylus 110 is engaged with the membrane 44 over one of the indicia 130, the computer 108 can respond to the contact as if the indicia were a "button." Therefore, as used herein, a "button" can be an image seen through the tablet 44 (either from the screen 60 or from printed material 128 or the like) that can serve the function of an electro-mechanical button or the like when the tablet 44 is activated over a button image.

A lid 134 is connected to the back end 116 of case 112 by hinge 136. When open as shown or folded back to contact the bottom 124 of case 112, the tablet 44 and screen 60 are available for use. When the cover 134 is folded over the top 122 of case 112, it fully covers the tablet 44 to protect the delicate membrane material. The lid 134 is provided with a latch member 138 which engages a latch member 140 when it is overlying the top 122 of the computer. The latch member 138 is disengaged from the latch member 140 by a mechanical latch release 142.

Also seen in FIG. 2 is an "on" switch 144, a contrast adjustment 146, and a grille 148 for the speaker 76. The stylus 110 is of a collapsible design and can fit into an opening 150 along the right side 120 of case 112. Not seen in this figure along the right side 120 of the case 112 is an opening for a PCMCIA card which can engage PCMCIA connector 24, the DIN 8 port 94, and power input jack. Not seen along the bottom 124 of the case 112 is a battery access cover and a mechanical ejection button for a PCMCIA card engaged with the PCMCIA connector 24. The IR port 92 is provided along back 116 of the case 112 and is exposed for use when the cover 134 is folded against the bottom 124 of the case 112. The remaining components and systems of the computer block diagram 10 of FIG. 1 are enclosed within the case 112 of the computer system 108.

It should be noted that the preceding discussion is of a preferred embodiment of the present invention, and that there are many alternatives for the stylus 110 as illustrated. For example, a fingernail or other pointed object could be used with the tablet 44 of the present invention. Also, there are other types of tablets available that utilize other types of stylus.

Other types of pointing devices can also be used in conjunction with the present invention. While the method of the present invention is described in the context of a pen-based system, other pointing devices such as a computer mouse, a track ball, a track pad, a tablet, etc. can be used to manipulate a pointer on a screen of a general purpose computer. Therefore, as used herein, the terms "pointer", "pointing device", "pointing apparatus", "pointing means", and the like will refer to any mechanism, device, or system for designating to a particular location on a screen of a computer display.

Figure 3:
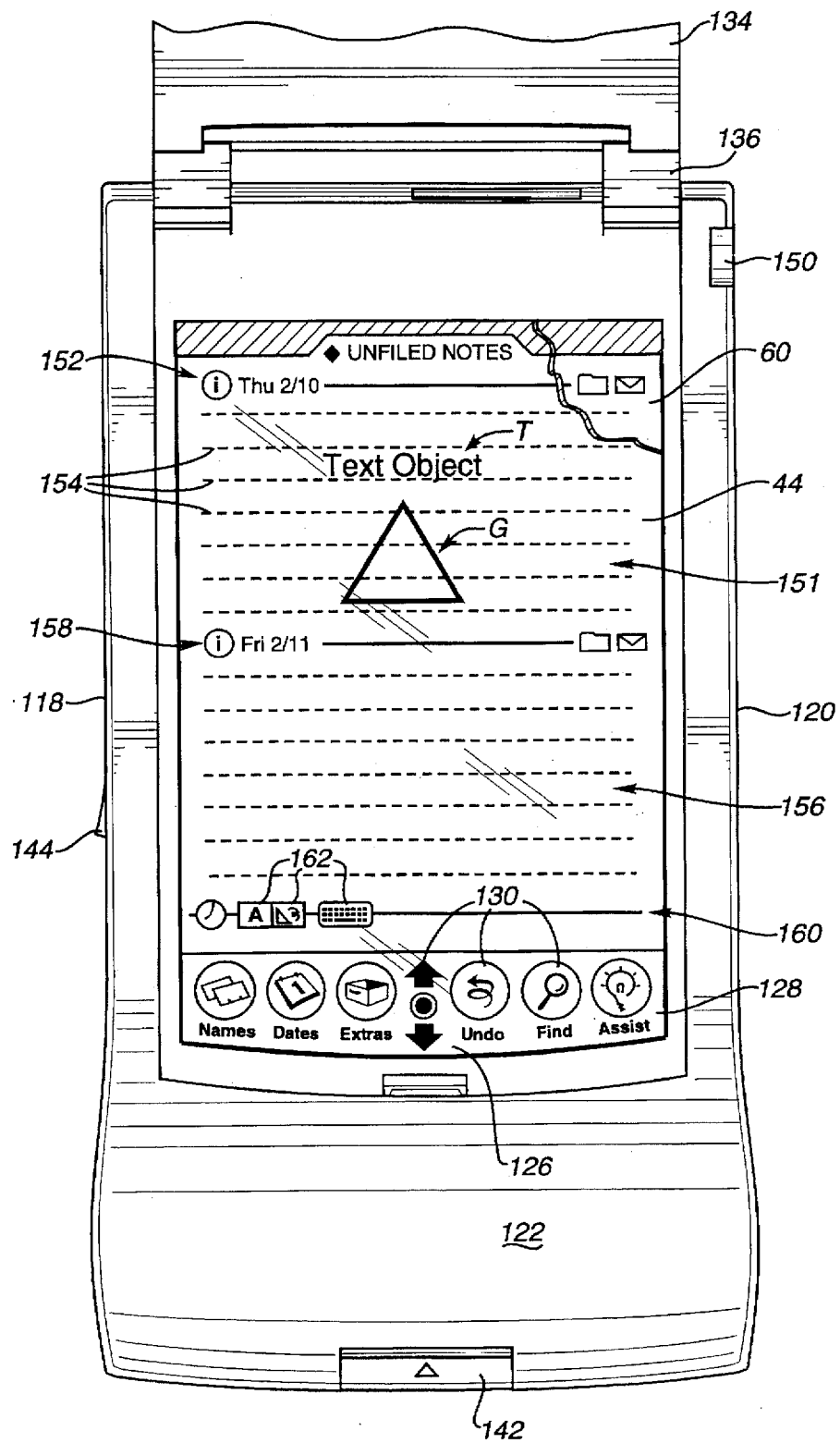
FIG. 3 is a top plan view of the housing and display assembly of pen-based computer system of FIG. 2.

With additional reference to FIG. 3, information is input into the pen-based computer system by "writing" on the tablet 44 with stylus 110 or the like. Information concerning the location of the tip 132 of stylus 110 on the tablet 44 of the display system 16 is input into the CPU 12 via controller 28. Typically, this information comprises the Cartesian (i.e. x & y) coordinates of a pixel of the screen 60 over which the tip 132 of the stylus 110 is positioned. The CPU 12 then processes the data under control of an operating system (stored in ROM 40) and possibly an application program stored in memory system 14 or elsewhere (such as on a PCMCIA card engaged with PCMCIA connector 24). The CPU 12 next produces data which is transferred to the screen 60 via ASIC 56 to produce appropriate images on the screen.

Upon power-up, pen based computer system 106 displays on screen 60 an initial "note" area 151 including a header bar 152 and a number of guidelines 154. The header bar 152 preferably includes the date of creation of the note area 151 and a number of icons and "soft" buttons, not particularly germane to the discussion of the present invention. The guidelines 154 aid a user in entering text, graphics, and data into the pen-based computer system 106. A text object T of the text "Text Object" and a graphic object G of a triangle are shown as being entered within note area 151.

Additional note areas, such as a second note area 156, can be formed by the user by drawing a substantially horizontal line across the tablet 44 with the stylus 110. The substantially horizontal line is recognized by the computer system 106 and is converted into a second header bar 158. Additional text, graphical, and other data can then be entered into this second note area 156.

The screen illustrated in FIG. 3 is referred to as the "notepad", and is preferably an application program running under the operating system of the pen based computer system 10. In this preferred embodiment, the notepad is a special or "base" application which is usually or normally available beneath higher level applications. The notepad application, like other applications, run within a window, which in this instance comprises the entire screen 60. Therefore, as used herein, a "window" is the entire screen or any portion of an entire screen which is dedicated to a particular application program. A description of the operation and use of the notepad can be found in U.S. Pat. No. 5,398,310, assigned to the assignee of the present invention, and incorporated herein by reference.

A status bar 160 is provided at the bottom of the notepad application. The status bar 160 is provided with a number of active and display areas, which again are not particularly germane to the present invention and will therefore not be discussed in detail herein.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects may be implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 152 and 158 include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III*, by C. Rose et at., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 60 can form a first or "root" layer, with the status bar 160, for example, positioned in a second layer "over" the root layer. The various buttons 162 of the status bar 160 are positioned in a third layer "over" the second and root layers. The view system automatically handles "taps" and other gestures of the stylus 110 on the screen 60 by returning information concerning the tap or gesture and any object to which it may be related. U.S. patent application Ser. No. 07/976,970 filed Nov. 16, 1992 on behalf of Foster et. al, entitled "Status Bar for Application Windows" and assigned to the assignee of the present invention describes a preferred view system and how to make and use the status bar, and is incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art.

Figure 8:
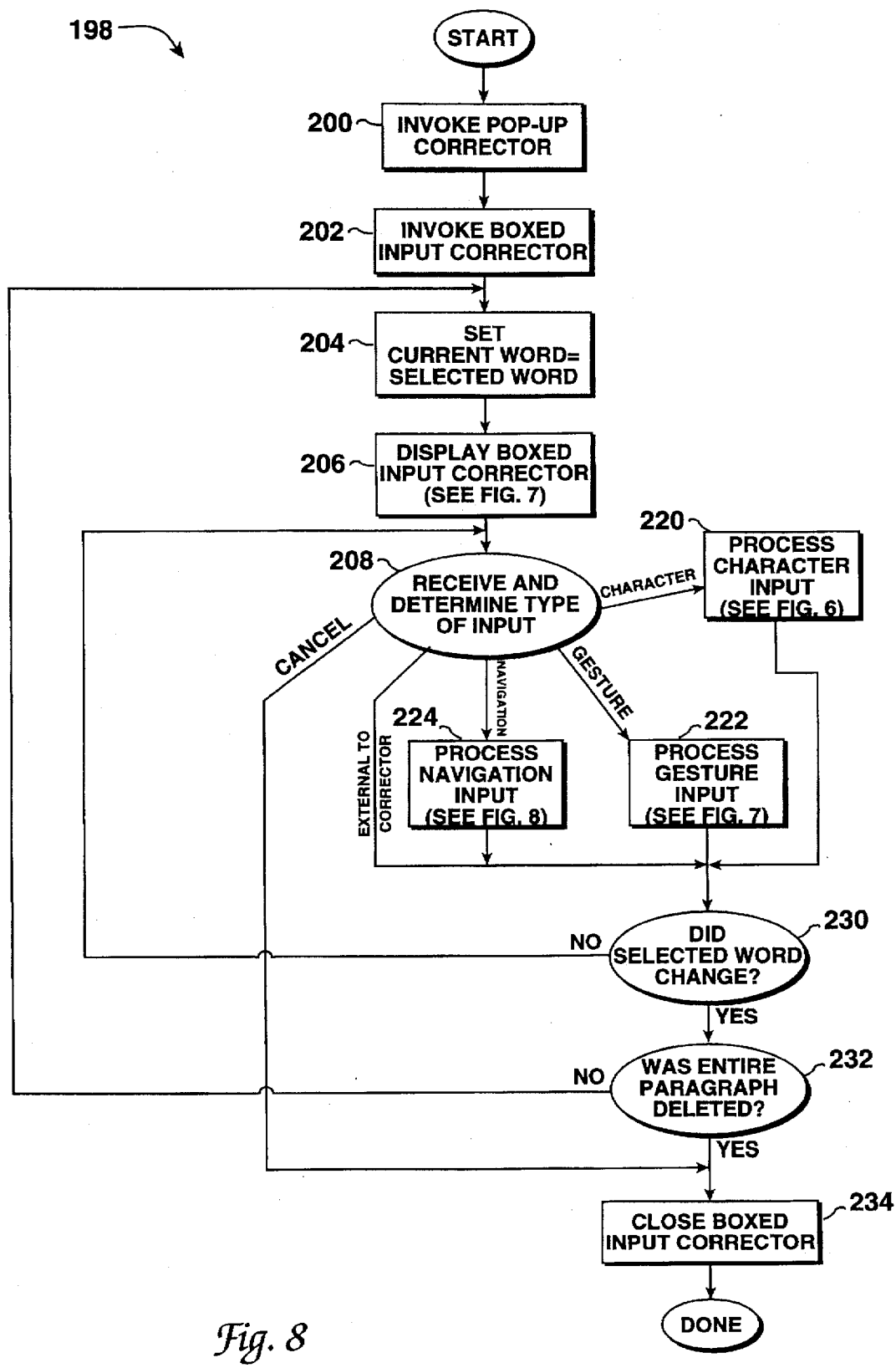
FIG. 8 is a flow chart illustrating a correction method in accordance with one aspect of the present invention.

With reference to FIGS. 4–8, a boxed input correction system implemented on a computer system in accordance with one embodiment of the present invention will be described. FIGS. 4–7 provide computer screen displays illustrating one sample sequence for invoking a boxed input corrector 180, while FIG. 8 shows a flow chart illustrating a correction method in accordance with one aspect of the present invention. Similar to FIG. 3, each of FIGS. 4–7 show a screen display of a notepad having a note area 151 including a header bar 152, a number of guidelines 154, a status bar 160 and various buttons 162.

FIG. 4 further includes a selected word 164 and an insert cursor 166. For the sake of discussion, assume that a user of a pen-based computer system 10 utilized a stylus 110 to enter an ink word representation corresponding to the selected word 164. In turn, recognition software implemented on the computer system 10 processed the ink word and produced a "best guess" being the selected word 164. In this case, the character string "correct" is displayed as the best guess of the selected word 164.

FIG. 5 illustrates a response of the boxed input correction system to the selected word 164 being selected to invoke a pop-up corrector 168 in accordance with one embodiment of the present invention. The pop-up corrector 168 provides an alternates list 170, an ink word 172, a keyboard button 174, and a boxed input corrector (BIC) selector button 176. The alternates list 170 provides the user with some character strings which the recognition software believes are close matches for the ink word 172. The ink word 172 represents the original strokes which comprised the word which the user entered. Selecting the keyboard button 174 will display a keyboard window. Once the keyboard window is displayed, the user can select desired characters from the keyboard via the stylus 110.

As will be apparent from FIG. 6, when any given button is selected, the given button graphic is momentarily inverted to indicate the selection visually. In the particular example of FIG. 6, the inverted BIC selector button 176' is shown. Once selected, the boxed input corrector 180 displays a window and includes a number of comb boxes 182, each of which have an associated character displayed therein, a keyboard button 174, and a cancel button 184. Additionally, note that the selected word 164 is now highlighted (by way of inversion) thereby indicating that it is the selected word and thus available for correction within the boxed input corrector 182. As will be described below in more detail, a variety of corrector commands enable the user to easily edit and correct the selected word 164, as well as navigate the boxed input corrector 180 onto adjacent words and throughout available paragraphs.

Focusing attention on FIG. 8, a correction method 198 in accordance with one aspect of the present invention will be described. An initial step 200 invokes a pop-up corrector such as pop-up corrector 168. Note that pop-up corrector 168 may invoked through a variety of suitable mechanisms. In preferred embodiments, the invocation mechanism is a direct request from a user embodied by a double-tap of the stylus 110 onto the selected word 164. However, in other embodiments, the recognition software may invoke the pop-up corrector 168 in and of itself. By way of example, automatic invocation may be suitable either when two or more character strings in an alternates list 170 have an equal ranking or when none of the character strings in the alternates list 170 have a probability above a predefined threshold. As will be appreciated by those of skill in the art, an automatic invocation must be implemented carefully as it must not inappropriately interfere with the user's data entry.

In any event, following step 200, a step 202 invokes a boxed input corrector 180. In some embodiments, the boxed input corrector 180 is accessible from the pop-corrector 168. However, other embodiments may provide a mechanism for invoking the boxed input corrector 180 from other windows such as directly from within the note area 151.

In order for the described embodiments to properly function, during either one of steps 200 and 202, a selected word must be provided. Typically the selected word will correspond to a word which was selected when the correctors were invoked. However, as will be seen below, the selected word may change while the boxed input corrector 180 is active. The present invention teaches tracking the selected word so that the display of the boxed input corrector 180 follows the selected word.

A next step 204 sets a current word equal to the selected word. In the described embodiment, the current word is that word which the boxed input corrector 180 currently displays and operates on. It should be noted that, while the current word and the selected word may (usually only for a couple of steps) at times be different, this is only as an aid in the description. As will be appreciated by those skilled in the art, the computer code implementing this functionality may only maintain one single word for processing.

In any event, a step 206 displays the boxed input corrector 180 with the current word entered in comb boxes 182. As will be appreciated, the current word may adhere to a fixed format which may be followed to provide a more meaningful display of the current word. One suitable method for performing display step 206 is described in more detail below with reference to FIG. 9. Once the boxed input corrector 182 is displayed in step 206, a step 208 waits to receive a corrector input. The possible types of corrector inputs include character correction inputs, gesture inputs, navigation inputs and external inputs.

In explanation, a character correction input corresponds to the user overwriting one or more of the characters displayed in the boxed input corrector 180. When step 208 determines that a character correction input has been entered, control is passed to a step 220 where the character correction input is processed. One method for performing character correction input processing step 220 is described in more detail below with reference to FIGS. 12 and 13.

A gesture input corresponds to the user entering one of a collection of characters which have a special meaning. When step 208 determines that a gesture input has been entered, control is passed to a step 222 wherein the gesture input is processed. Preferred embodiments of the boxed input corrector are capable of interpreting and acting on at least the following three types of gesture input: scrub gestures (both multiple character and single character scrub gestures), insert gestures, and tap gestures. Further explanation as well as suitable methods for processing scrub gestures, insert gestures, and tap gestures are described below in more detail with reference to FIGS. 14–16, 17–19, and 20.

A navigation input corresponds to the user indicating that they wish to navigate the boxed input corrector 180 within the current word (e.g. each character of the current word cannot be simultaneously displayed) or within text available in the current notepad, field, or application. When step 208 determines that a navigation input has been entered, control is passed to a step 224 wherein the navigation input is processed. For example, selection of the navigate left arrow 186 or the navigate right arrow 188 is a basic navigation input. One suitable method for processing navigation inputs is described in more detail below with reference to FIGS. 21–25.

Each of the character correction input, gesture input, and navigation input type correction input are considered to be generated from within the boxed input corrector 180. However, the boxed input corrector 180 is responsive to other input and/or commands entered external to the boxed input corrector 180. As shown in FIG. 7, the selected word is not only displayed within the boxed input corrector 180, but is also highlighted in the separate notepad window. If a paragraph of multiple words was present in the notepad window, the use may, concurrent with having the boxed input corrector 180 active, select a new word different from that shown in the boxed input corrector 180. In response, the current word displayed in the boxed input corrector 180 will change to match the new selected word. In another example, the user may delete the selected word from the notepad window. In this case, the new selected word becomes the previous word (if available, otherwise close the boxed input corrector 180) which is accordingly displayed in the boxed input corrector 180.

In any event, after processing the input in one of steps 220, 222, 224, or after an external event, control of the method 198 passes to a step 230. Step 230 determines if the selected word changed. When the selected word has not changed, control loops back to step 208 where, once again, the boxed input corrector 180 waits for user input. However, if the selected word has changed, a step 232 determines if the entire paragraph was deleted. If so, there are no more words available for correcting. When no words remain for correction, a step 234 closes the boxed input corrector 180 and the method 198 is terminated. On the other hand, if there are more words available for correcting, then a new selected word is available and control loops back to step 204 where the current word is set equal to the new selected word and the correction method 198 continues.

In addition to the above described correction inputs, step 208 may receive a cancel input via the user selecting a cancel button 184. In this case, control goes from step 208 to step 234, the boxed input corrector 180 is closed, and the correction method 198 is done.

Figure 9:
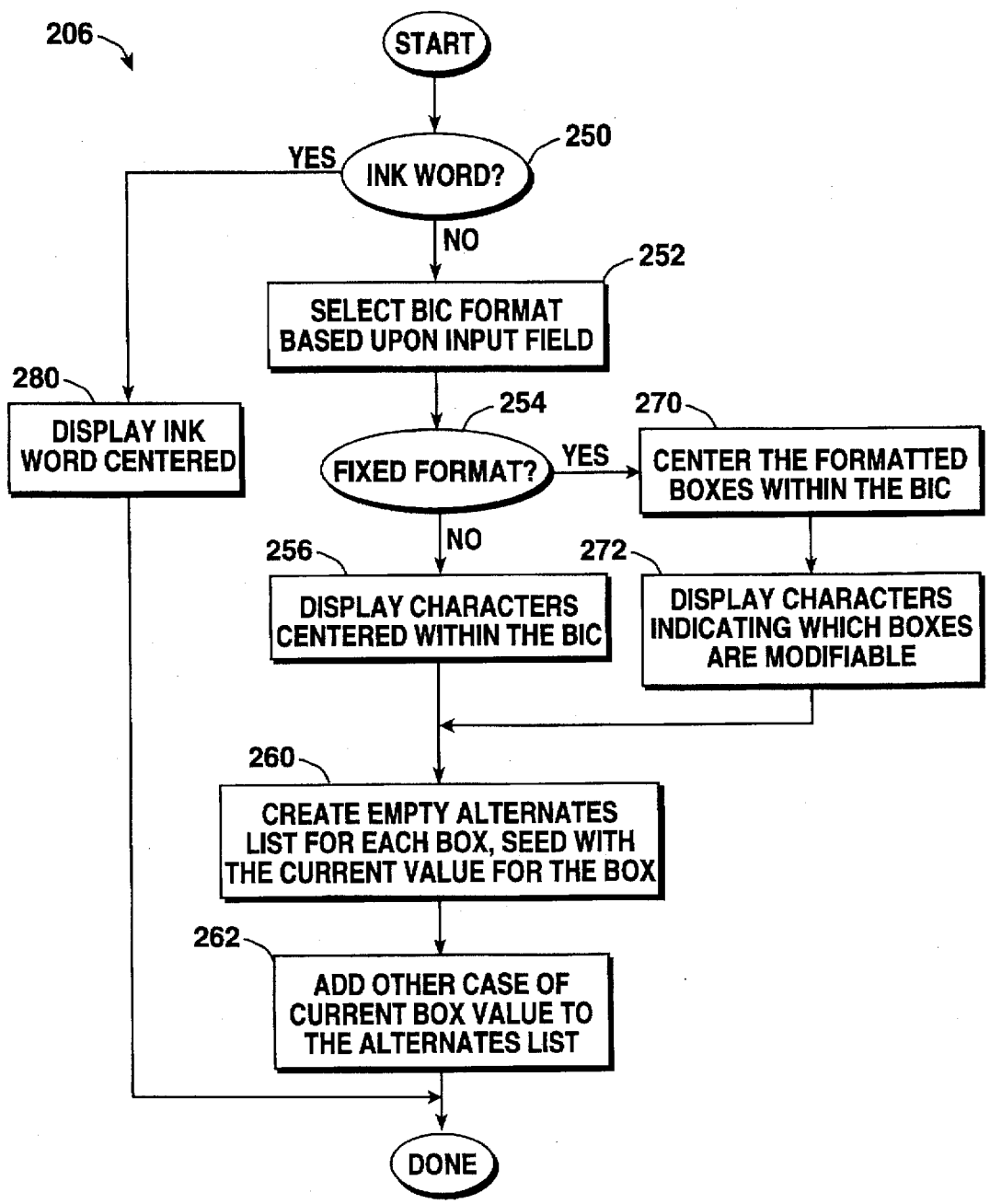
FIG. 9 is a flow chart illustrating one suitable display method for performing step 206 of FIG. 8.
Figure 11:
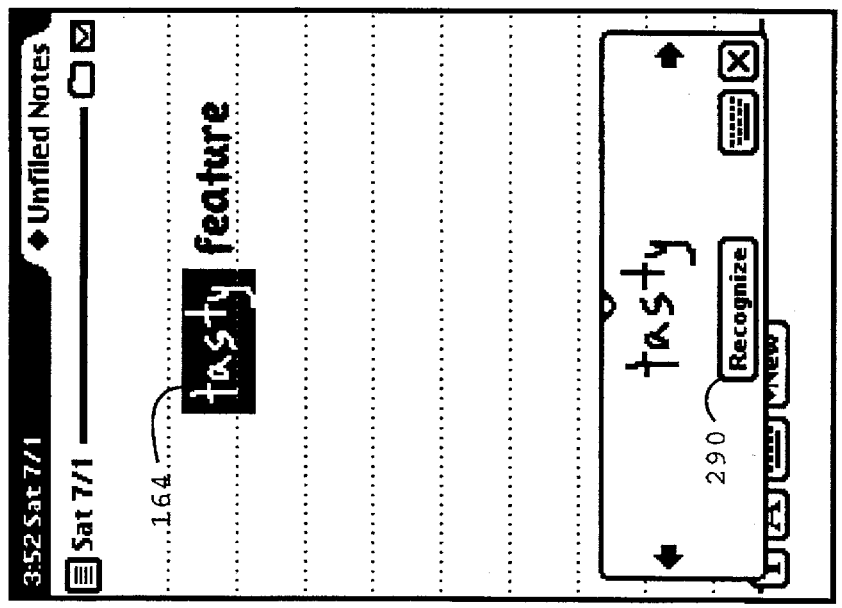
FIG. 11 is a computer screen display illustrating a boxed input corrector invoked for an ink word in accordance with another embodiment of the present invention.
Figure 10:
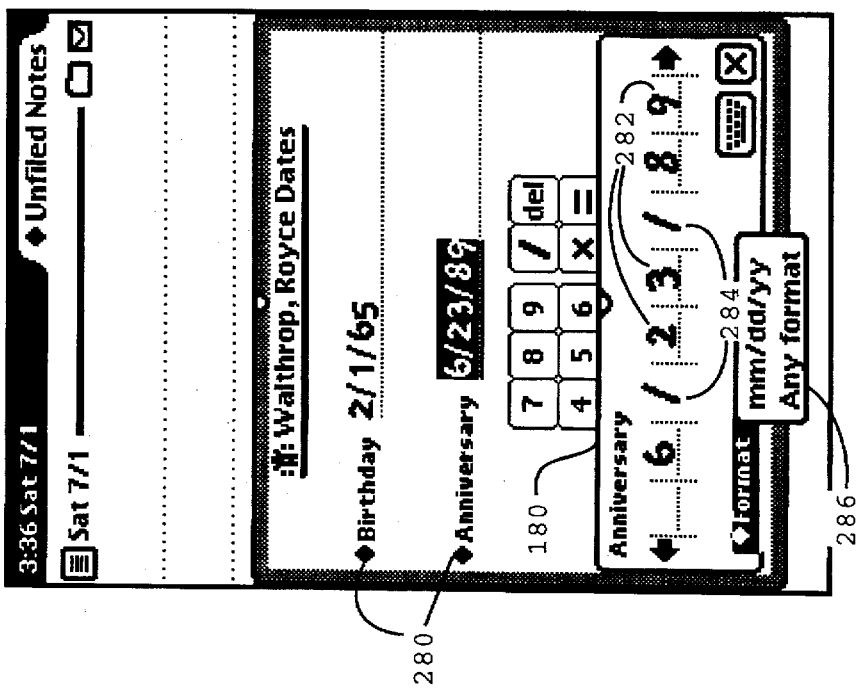
FIG. 10 is a computer screen display illustrating a boxed input corrector adhering to a fixed format in accordance with one embodiment of the present invention.

With reference to FIGS. 9–11, a display method 206 in accordance with one embodiment of the present invention will be described. FIG. 9 illustrates a flow chart of a method which is generally applicable, while FIGS. 10 and 11 illustrate specific examples.

Turning first to the example of FIG. 10, a boxed input corrector 180 has been invoked with the selected word being a string of well defined characters originating from an input field which defines a fixed format for the selected word. Specifically, the selected word adheres to a month/day/year United States date format. In the fixed format case, the boxed input corrector 180 displays formatted boxes 282 containing their associated modifiable characters as well as fixed hyphenation 284. In the example of FIG. 10, the character "/" serves to separate the different fields.

By defining the format within the boxed input corrector 180, the present invention provides a beneficial mechanism for the user to enter the necessary corrections. Further, in the fixed format scenario, some embodiments of the boxed input corrector 180 display a format selection button 286 which enables the user to alter the format.

Turning next to the example of FIG. 11, a boxed input corrector 180 has been invoked with the selected word 164 being an ink word. That is, the selected word has not been processed and "guessed" by the character recognized. Rather, the original strokes which the user entered are stored and displayed. In this example, the ink word is centered within the boxed input corrector 180 and sized such that the whole ink word is visible therein. In a way, the ink word is a single unrecognized character displayed in a single box. In the illustrated embodiment, a "recognize" button 290 is displayed within the boxed input corrector. When the user selects the recognize button 290, the recognition software will process the ink word in order to produce a string of one or more well defined characters.

Now turning directly to FIG. 9, the display method 206 will be described. An initial step 250 determines if the current word (or selected word, depending upon the embodiment) is an ink word. When the current word is the ink word, control passes to a step 280 which displays the ink word centered and sized such that the whole ink word is visible. When the current word is a string of one or more well defined characters, then a step 252 selects the display and correction format of the boxed input corrector 180. In general, the format will be determined based on the field from which the current word originated. However, in some embodiments the user may select a specific format which is then forced onto the current word. The application may also determine the format in which the exact number of characters and their possible values are known.

A next step 254 determines whether the current word should adhere to a fixed format. As will be appreciated, there are a plethora of fixed formats possible. Some examples include United States date format, international date format, currency format, scientific format, drivers license format, vehicle identification number format, social security number format, hexadecimal number format, and binary number format. In any event, when the current word does adhere to some fixed format, a step 270 generates formatted boxes centered within the boxed input corrector 180. With some formats, the current word may not be entirely displayed. In some embodiments, the current word is still centered, thus visually cropping off characters of each end of the current word. In other embodiments, the current word is displayed such that the left most character is visible and characters are only visually cropped off of the right most end of the current word. Then a step 272 displays the characters of the current word within the appropriate boxes while providing an indication of which characters are modifiable. As shown in FIG. 10, when the fixed format contains constant values such as the hyphenation character "/", the constant values are not surrounded by the comb indicia. This indicates that the characters which have the comb indicia are modifiable.

In the case where the selected word is the string of one or more well defined characters, once a step 256 displays the word centered in the boxed input corrector 180, a step 260 creates an empty alternates list for each box and further seeds each alternate list with each current character associated with each box. Then a step 262 adds, when appropriate, the other case of a given current character into its associated alternates list. For example, if the given current character is the lower case character "a", then the upper case character "A" is added into the alternates list. Once the alternates list is created and seeded in steps 260 and 262, the display method 206 is complete.

It will be appreciated that the sequence of the two series of steps 252-272 and steps 260 and 262 could be switched (i.e. first perform the series 260 and 262, then perform the series 252-272) without altering the intended result. Additionally, these two series could be performed in parallel on a multi-threaded computer system.

Figure 12:
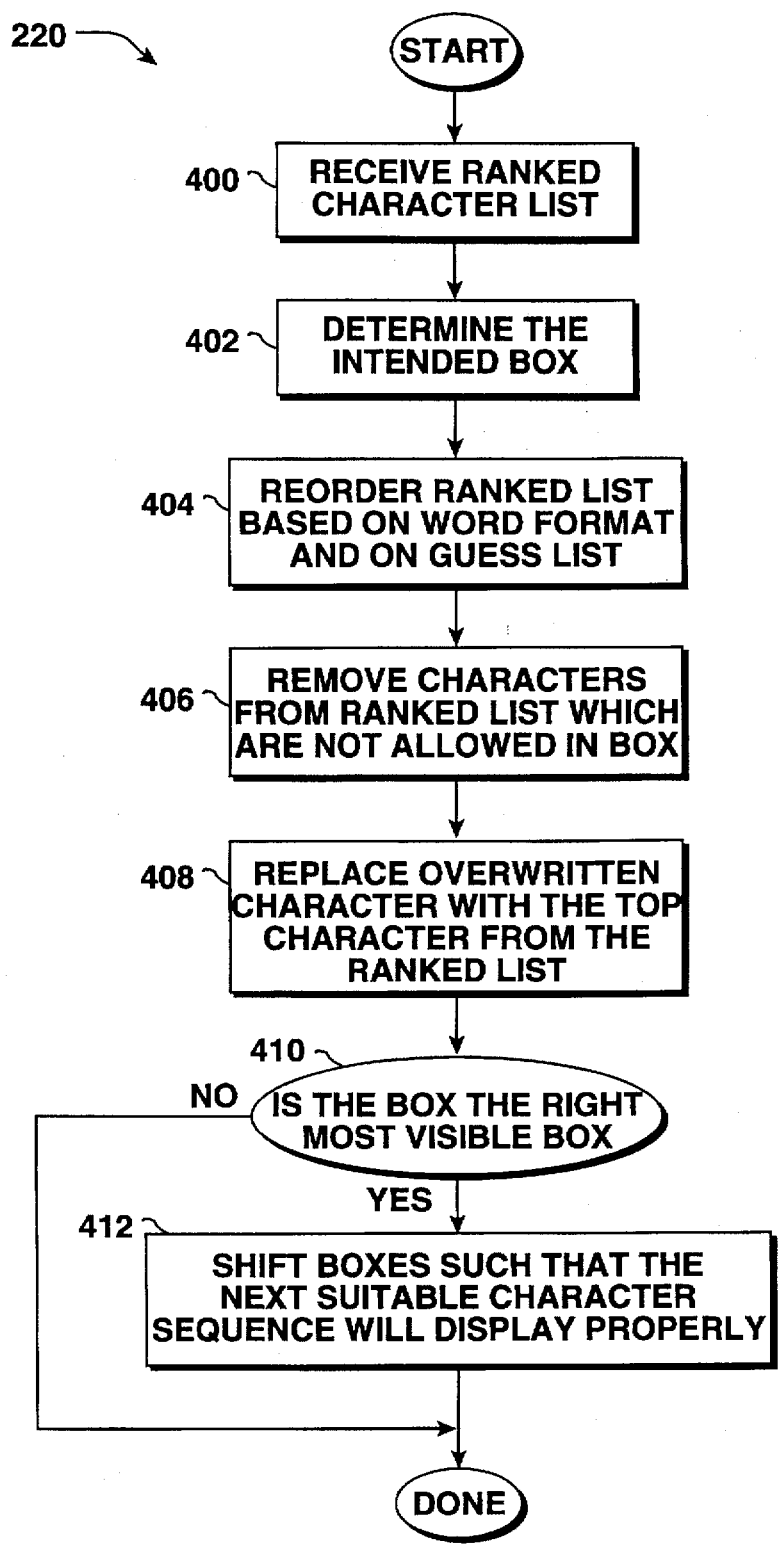
FIG. 12 is a flow chart illustrating one suitable method for processing a character editing input in accordance with still another embodiment of the present invention.
Figure 13:
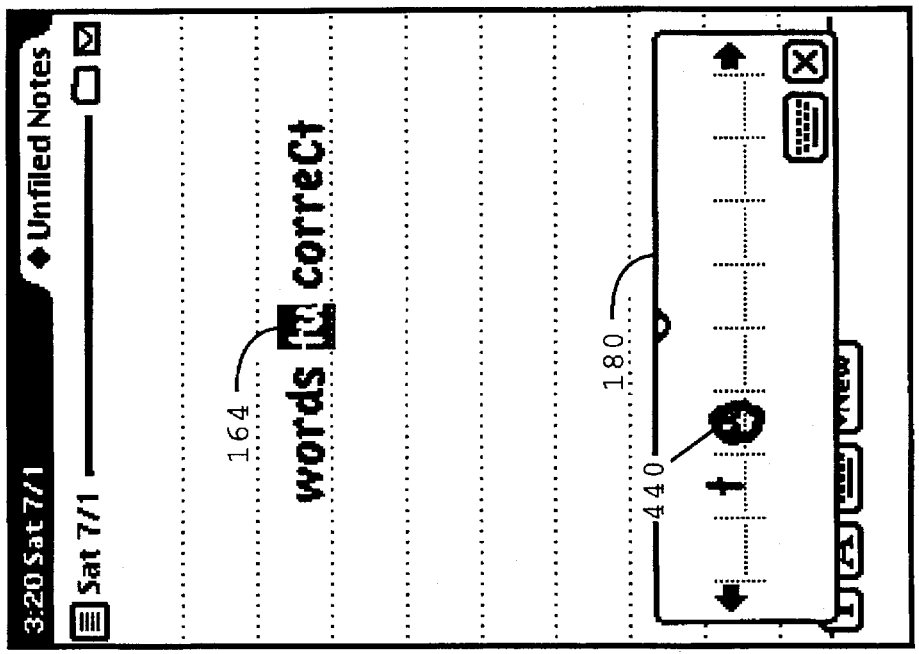
FIG. 13 is a computer screen display illustrating one example character editing input in accordance with one embodiment of the present invention.

With reference to FIGS. 12 and 13, a method for processing a character correction input in accordance with one aspect of the present invention will now be described. FIG. 12 illustrates a flow chart of one suitable method for performing step 220 of FIG. 6. FIG. 13 illustrates one example of a character correction input.

Turning first to the example of FIG. 13, a selected word 164 is the character string "tu" and is displayed in the boxed input corrector 180. In this example, the character correction input is a user scribble of an "o" (overwriting the improper character "u") which is in turn recognized by the computer system.

Now turning directly to FIG. 12, the character correction input processing method 220 will be further described. In general, the character correction input will be entered into the boxed input corrector 180 and forwarded to recognition software. In response, a step 400 receives a ranked character list containing a set of characters which the recognition software suggests as possible representations of the character correction input. A step 402 determines a given box for which the character correction input was intended. Then, a step 404 reorders the ranked character list based on the word format (if one exists) and on a previous guess list. For example, if a user has entered a previous character correction input and some characters suggested by the recognition software were in turn rejected by the user, when these characters are suggested again by the recognition software, these previously rejected characters are put to the bottom of the ranked character list.

A next step 406 removes all characters from the ranked character list which are not allowed in the given box. For example, within an input field formatted for social security numbers, only integers ranging from 0-9 are allowed within certain boxes. Thus the formatting is advantageously taken into consideration. It should be noted that the order of steps 404 and 406 may be switched resulting in perhaps a more optimal result (less characters to reorder). Once the ranked list has been properly ordered and trimmed, a step 408 replaces the overwritten character with the top ranked character in the ranked character list. In the case of FIG. 13, an "o" would be displayed in the given box.

When the character changes, it may be provide more visual meaning to further alter the display. Accordingly, a step 410 determines if the box which contains the altered character is the right most visible box within the boxed input corrector 180. When it is, a step 412 shifts the boxes such that a next suitable character sequence will display properly. For example, if the current word is large it may not be entirely displayed; when the character in the right most visible box is edited, the display may scroll in order to show the edited character in a more suitable context. In any event, once the visual orientation of the current word is set, the method 220 is complete.

Figure 14:
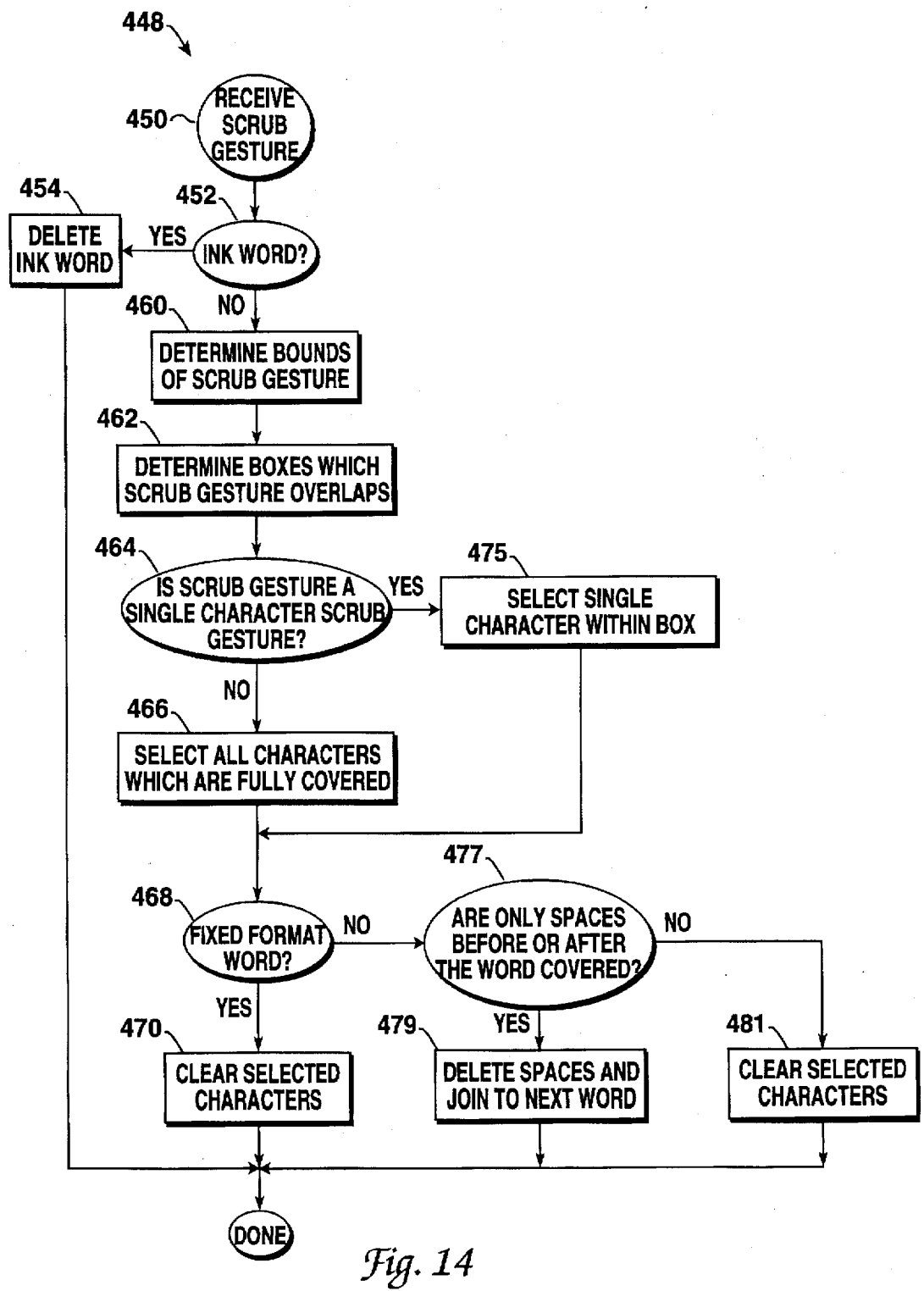
FIG. 14 is a flow chart illustrating one suitable method for processing a scrub gesture in accordance with one aspect of the present invention.
Figure 16:
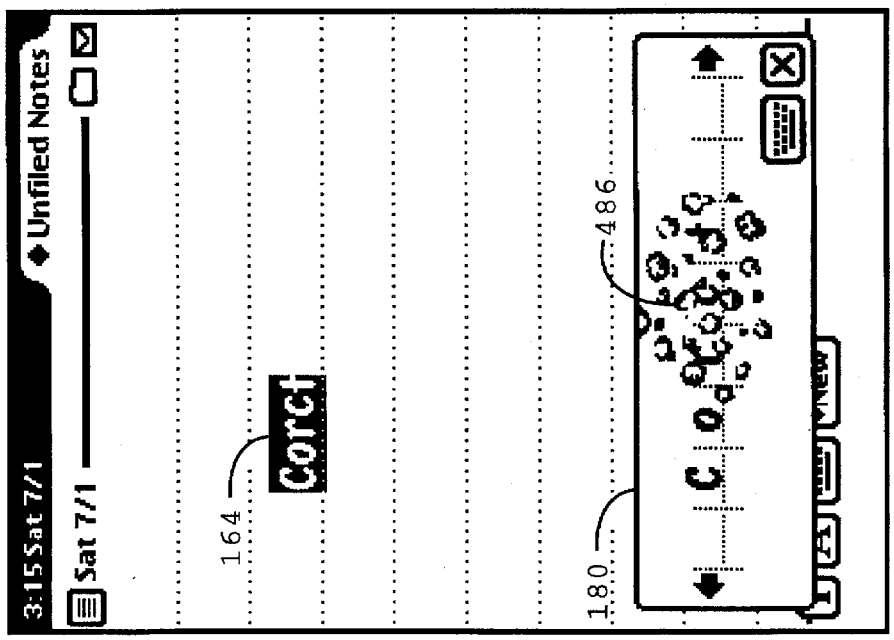
FIG. 16 is a computer screen display illustrating a response of a boxed input corrector to a scrub gesture input in accordance with one embodiment of the present invention.
Figure 15:
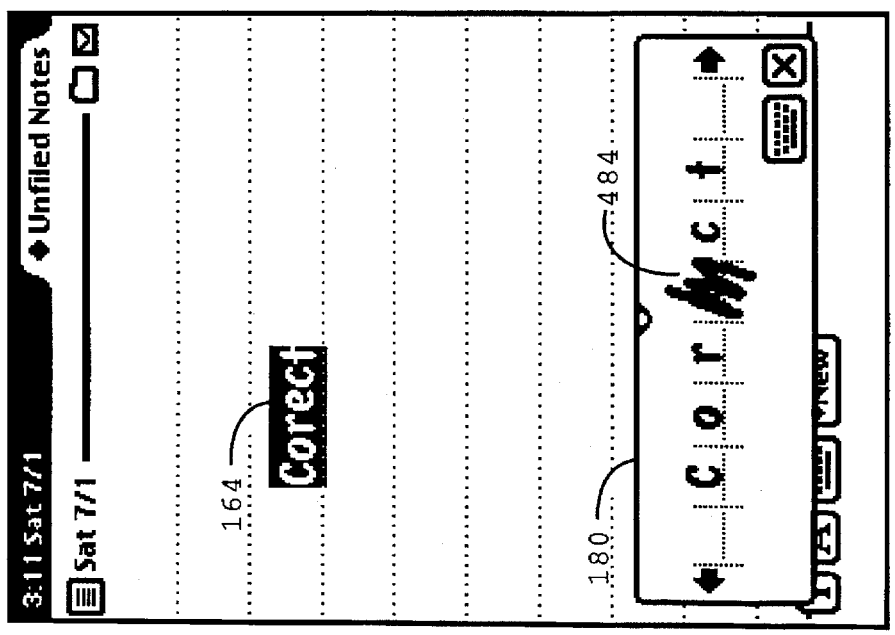
FIG. 15 is a computer screen display illustrating a single character scrub gesture in accordance with one embodiment of the present invention.

With reference to FIGS. 14-16, a method 448 for processing a scrub gesture input in accordance with one embodiment of the present invention will be described. FIG. 14 illustrates a flow chart of one suitable method 448, while FIGS. 15 and 16 show one specific example.

Turning first to the scrub gesture input example of FIG. 15, a selected word 164 is displayed on the notepad window and also centered within the boxed input corrector. Further, a scrub gesture 484 is shown in the boxed input corrector overwriting the character "e." In this case, the scrub gesture 484 is a single character scrub gesture. In explanation, if a scrub gesture overlaps only a single box, it must have features which differentiate it from similar characters such as "M" and "W", each of which have three change of direction turns. One suitable strategy might require the single character scrub gesture to have more than three change of direction turns. In any event, a multiple character scrub gesture must bound a relatively larger area, and in some embodiments may have only three change of direction turns. For a more detailed description on the nature of suitable scrub gestures, please see copending U.S. patent application Ser. No. 08/070,094 which is incorporated herein by reference in its entirety.

FIG. 16 illustrates the deletion of the character "e" from the selected word 164. A animated "cloud" 486 indicates that the character is being deleted, while the highlighted representation of the selected word 164 changes accordingly.

Turning directly to FIG. 14, the scrub gesture input processing method 448 will now be further described. As background, the method 448 is suitable for performing step 220 of FIG. 8. The method begins when a step 450 receives a scrub gesture 484. A next step determines if a selected word which the scrub gesture 484 overlaps is an ink word. When the selected word 164 is an ink word, then a step 454 deletes the ink word. However, when the selected word 164 is a string of one or more well defined characters, a step 460 determines the bounds of the scrub gesture 486. Then a step 462 identifies which boxes the bounds of the scrub gesture 484 overlaps.

A next step 464 determines if the scrub gesture 484 is a single character scrub gesture. When the scrub gesture 484 is a single character type scrub gesture, a step 475 selects the single character which the scrub gesture overlaps. On the other hand, when the scrub gesture 484 is not a single character type scrub gesture, then a step 466 selects each character which the bounds of the scrub gesture 484 fully covers.

After the appropriate characters are selected, a step 468 determines if the selected word 164 adheres to a fixed format. When the selected word 164 is a fixed format word, a step 470 clears the selected characters (as opposed to deleted the character(s) and their associated box(es)). However, if the word is a free format word, then a step 477 further determines if only spaces either before or after the selected word are covered.

When only spaces either before or after the selected word are covered, in some embodiments it is assumed that the user intends to join the selected word with the appropriate adjacent word. For example, if only spaces before the selected word 164 are selected by the bounding box of the scrub gesture input, then the appropriate adjacent word is the word immediately preceding the selected word. Accordingly, a step 479 will delete the spaces between a selected word 164 and an appropriate adjacent word, thereby merging the two words. For example, the appropriate adjacent word may be found in the same paragraph as the adjacent word, in a separate paragraph, or in a separate field. In the other case, wherein at least one character other than or in addition to space characters are selected, a step 481 simply clears the selected characters inserting spaces in the associated boxes.

Figure 17:
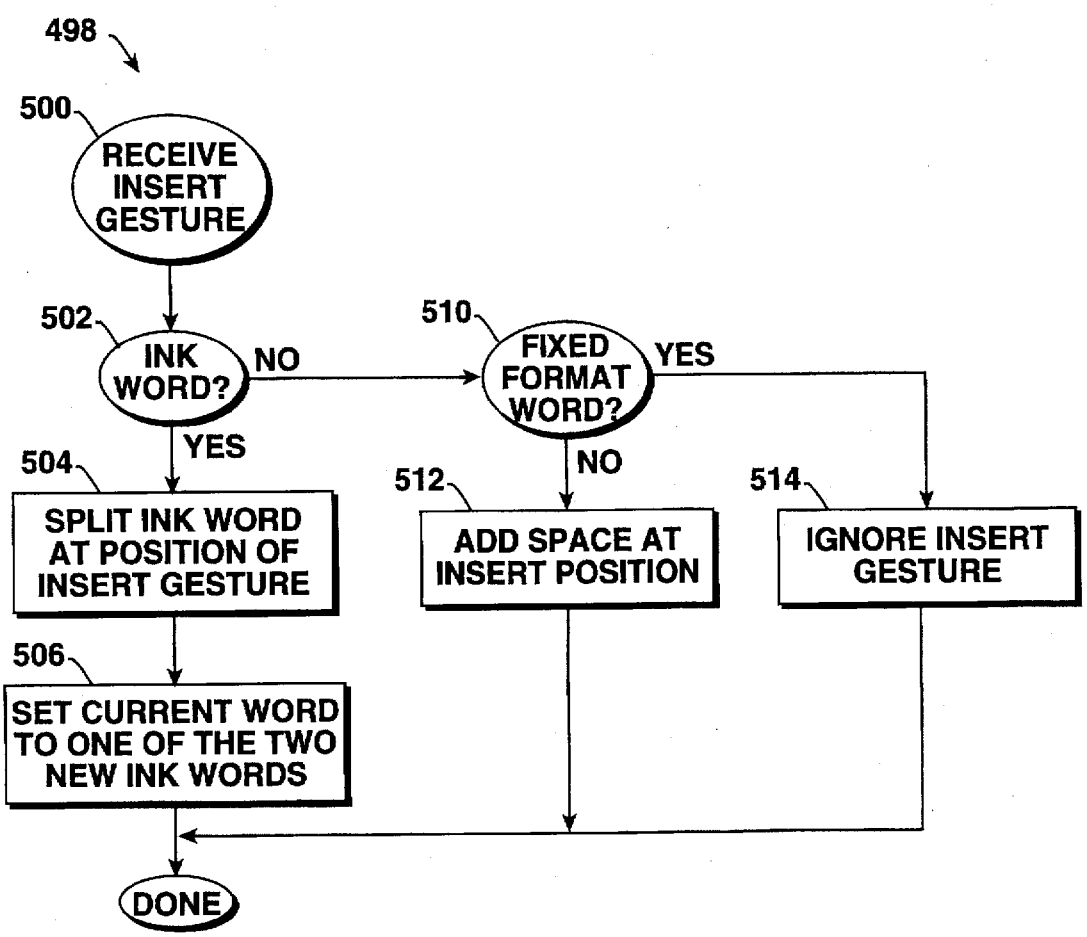
FIG. 17 is a flow chart illustrating a method for processing an insert gesture in accordance with one embodiment of the present invention.
Figure 19:
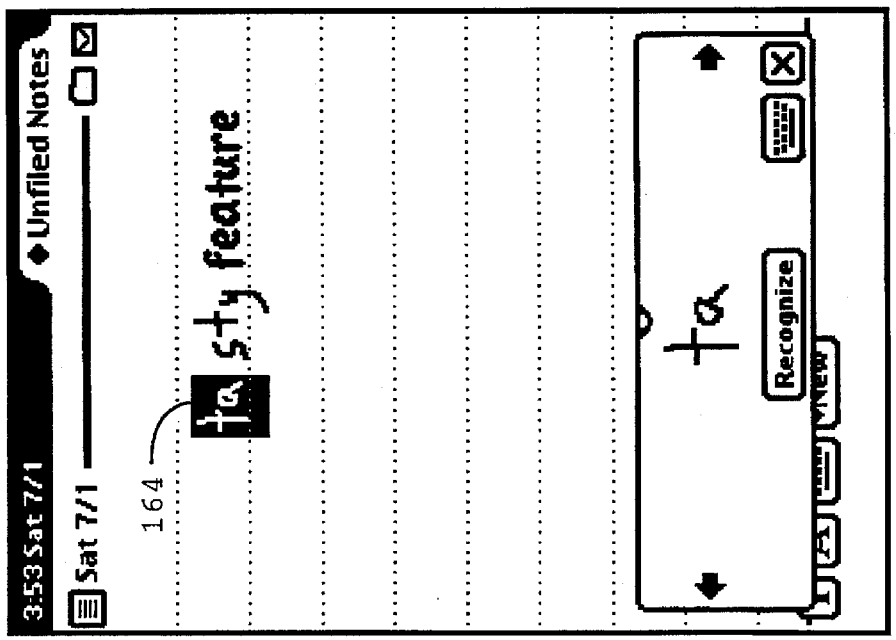
FIG. 19 is a computer screen display illustrating the boxed input corrector responding to the insert gesture applied to the ink word of FIG. 18 by splitting the ink word into two new ink words in accordance with still another embodiment of the present invention.
Figure 18:
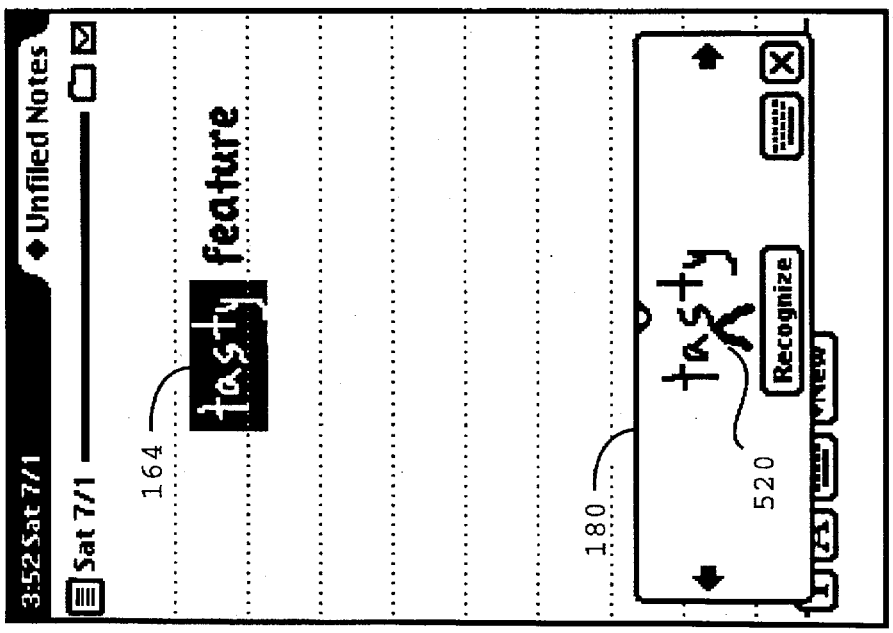
FIG. 18 is a computer screen display illustrating an insert gesture applied to an ink word within a boxed input corrector in accordance with yet another embodiment of the present invention.

With reference to FIGS. 17–19, a method 498 for processing an insert gesture input in accordance with one embodiment of the present invention will be described. FIG. 17 illustrates a flow chart of one suitable method 448, while FIGS. 18 and 19 show an example demonstrating the functionality of the insert gesture with respect to an ink word.

Referring first to the example found in FIG. 18, a selected word 164 is an ink word and is displayed centered within a boxed input corrector 180. According to the embodiment of FIG. 18, an insert gesture 520 is the familiar character "^", also referred to as a "caret." In the case where the selected word is the ink word, the insert gesture 520 causes the ink word to split at a position to which the insert gesture 520 points. Thus the ink word "tasty" is split between the "a" and the "s" to produces two separate ink words "ta" and "sty." As shown in FIG. 18, the selected word becomes a new selected word 164'.

Now turning back to FIG. 17, the insert method 498 will be described further. Initially a step 500 receives an insert gesture 520. As will be appreciated, a variety of insert gestures 520 may be suitable. A step 502 determines if the current word 164 is an ink word. When the selected word 164 is an ink word, a step 504 splits the ink word into two new ink words at the position of the insert gesture 520. Then, a step 506 sets the current word equal to one of the two new ink words. For example, in the embodiment of FIGS. 18 and 19, the new current word became the left most of the two new ink words.

When the selected word is a string of one or more well defined characters, process control branches along the NO branch of step 502 to a step 510. Step 510 determines if the selected word 164 follows a fixed format. If it does, then no new boxes may be inserted. Thus a step 514 ignores the insert gesture. That is, no action is taken. However, in some embodiments, a message may be displayed indicating that insertion is improper in a fixed format word. In any event, if the word is fixed format, the method 498 is complete. When the current word 164 does not adhere to a fixed format, then characters, spaces and words may be inserted. Accordingly, a step 512 adds a single space at the position of the insert gesture 520. After adding the space, the insert method 498 is complete.

Figure 20:
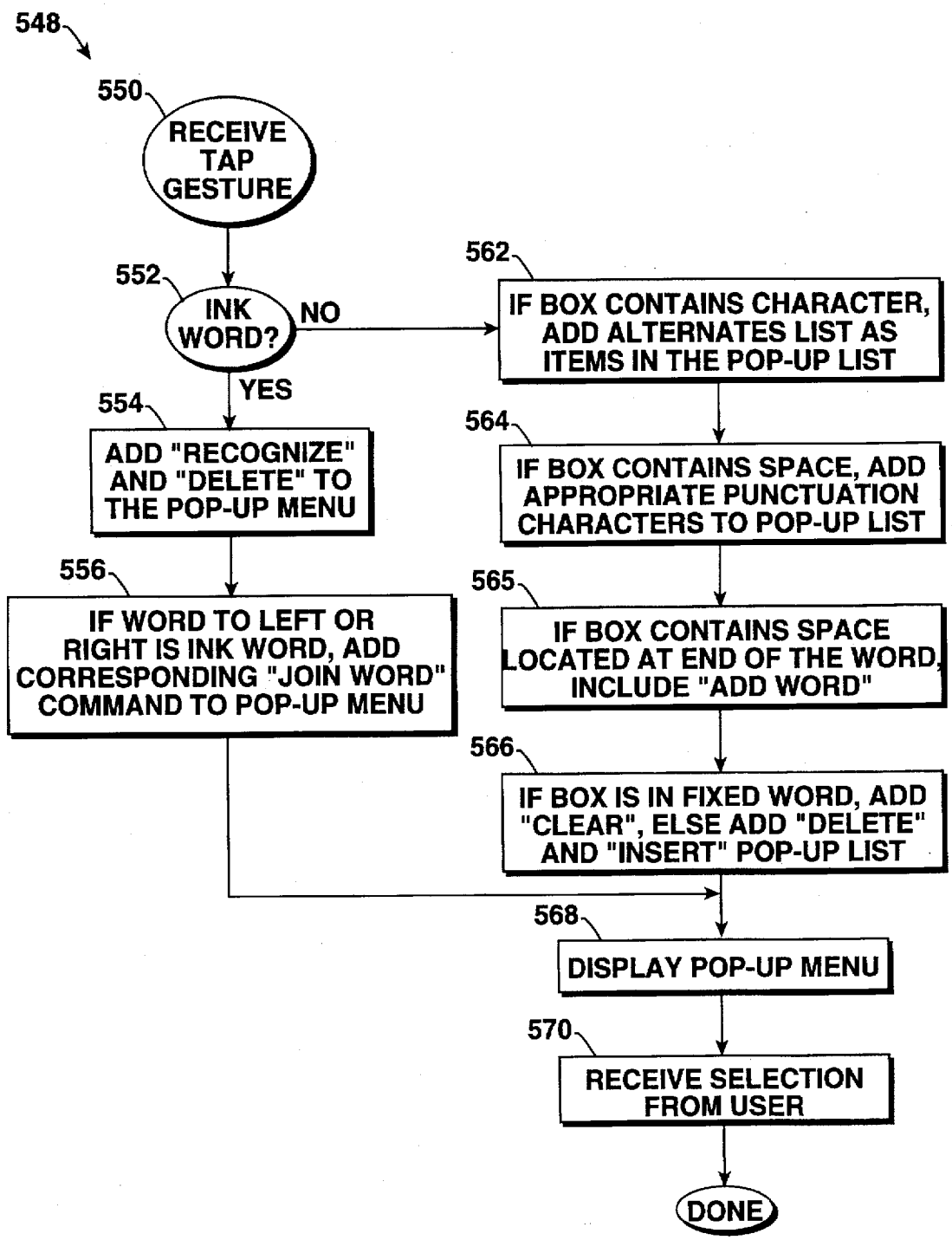
FIG. 20 is a flow chart illustrating a method for processing a tap gesture in accordance with one aspect of the present invention.

With attention focused on FIG. 20, one method 548 for processing a tap gesture will now be described. The method 548 is suitable to perform when step 208 of FIG. 8 receives a tap gesture. An initial step 550 receives a tap gesture input and creates an empty pop-up menu list. In one embodiment, the tap gesture input is accomplished when the user taps the stylus 110 twice quickly over an identified box displayed within the boxed input corrector 180. Those familiar with graphical user interfaces will realize that the described tap gesture is akin to the "double-click" procedure often used with a mouse-button to activate a displayed object. However, in preferred embodiments only a single tap is necessary. The pop-up menu list is created for storing appropriate commands which will subsequently be made available to the user.

A next step 552 determines if the current word is an ink word. When the current word is the ink word, control passes from step 552 to a step 554 which stores "recognize" and "delete" commands in the pop-up menu list. The functionality of the recognize command was described previously with reference to the recognize button 290 of FIG. 11. The delete command will simply enable the user to delete the ink word. A step 556 evaluates the immediately preceding and subsequent words to determine if they too are ink words. If the preceding adjacent word is an ink word, then a "join left" command will be included in the pop-up menu list. Similarly, when the subsequent adjacent word is an ink word, then a "join right" command will be included in the pop-up menu list. Following step 556, control is passed to a step 568 which will be described below following the discussion of steps 562–564.

When the current word is not an ink word, control passes from step 552 to a step 562. Steps 562–566 each evaluate the contents and format of the identified box wherein the tap gesture was received and, based on the evaluation, add additional commands to the pop-up menu list. When the identified box has a corresponding alternates list, the step 562 adds the corresponding alternates list to the pop-up menu list. When the identified box contains a space character, a step 564 includes appropriate punctuation to the pop-menu list. By way of example, if the identified box contains a space character and is positioned at the end of the current word, punctuation such as a period ("."), and exclamation point ("!") and a question mark ("?") are stored in the pop-up menu list. Additionally, when the space character is located at the end of the current word, a step 565 adds an "add word" command to the pop-menu list. When the identified box is in a fixed format word, then a step 566 adds a "clear" command to the pop-up menu list. If, however, the identified box is in a free format word, the step 566 adds "delete" and "insert" commands to the pop-up menu list. As will be appreciated, the order in which steps 562–566 are executed is not relevant to the outcome of method 548 and may be varied within the scope of the present invention.

Once the pop-menu list has been developed for either the ink word in steps 554 and 556 or the well defined character in steps 562–566, a step 568 displays a pop-up menu having the elements of the pop-up menu list as its menu items. Then, a step 570 waits, receives a selection from the pop-up menu, and performs the necessary processing associated with the selection.

Figure 21:
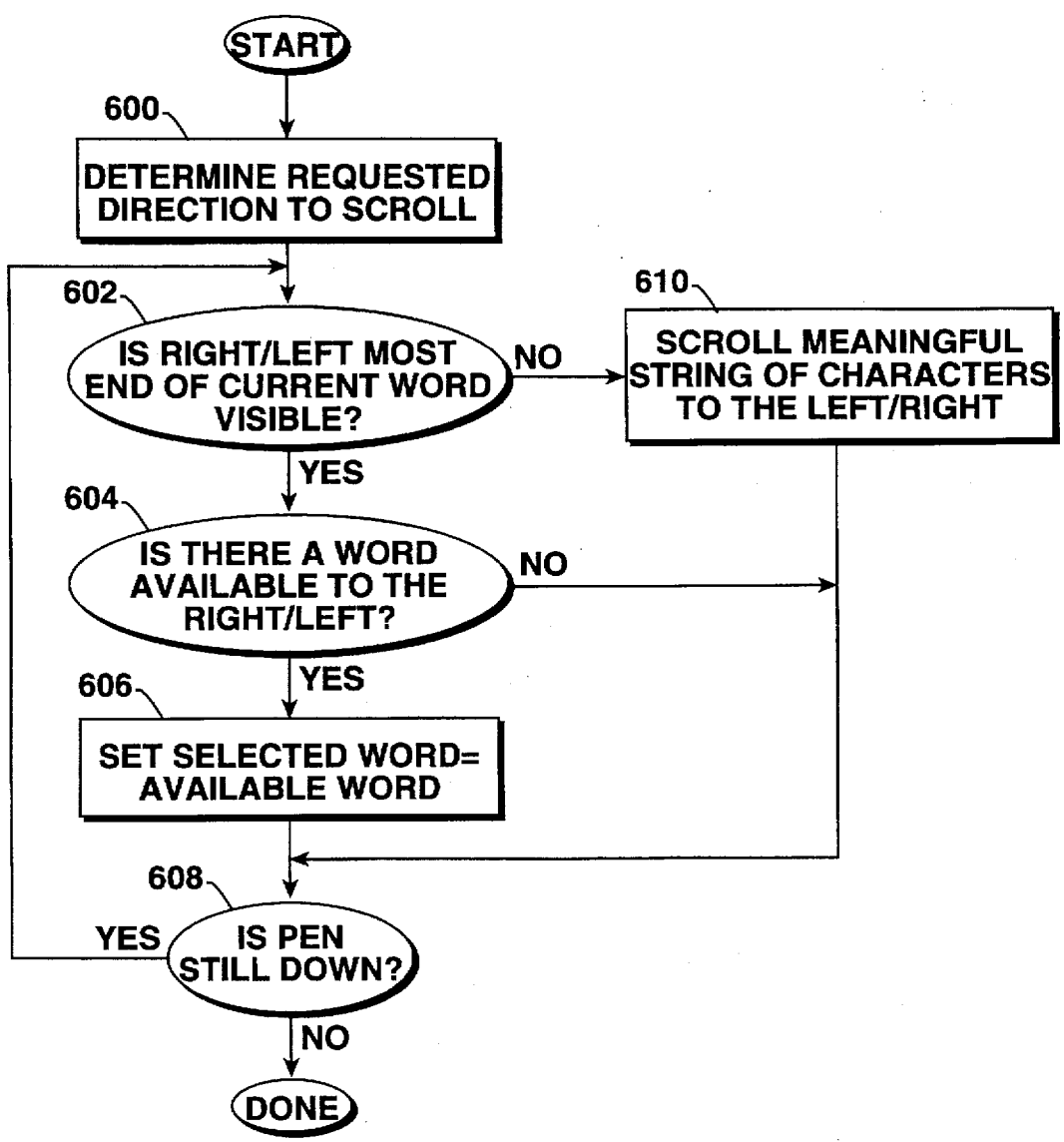
FIG. 21 is a flow chart illustrating a method for processing a navigation input in accordance with yet another aspect of the present invention.

With reference to FIGS. 21–25, a variety of methods for navigating the boxed input corrector 180 through the available words and/or characters are described. FIG. 21 illustrates a flow chart of a general navigation method 598, while FIGS. 22–25 will be used to help illustrate a number of example navigation maneuvers.

Turning directly to FIG. 21, a step 600 determines a requested scroll direction. In one embodiment, the step 208 of FIG. 8 will receive a navigation input taking the form of a stylus 110 selecting one of a navigate left arrow 186 or a navigate right arrow 188. When the requested navigation direction is right, a step 602 determines if the right most character of the current word is visible. If, however, the requested navigation direction is left, the step 602 determines if the left most character of the current word is visible. When step 602 determines that the appropriate extreme character (i.e. right or left most) is not visible, then a step 610 scrolls a meaningful string of characters to the left or right, according to the requested navigation direction. In general, the meaningful string of characters will move forward substantially, yet still display characters which provide context (i.e. characters from the same word). Some examples of this are described below with respect to FIGS. 22–25.

If an extreme character (right or left most) is visible, then a step 604 determines if a corresponding adjacent word is available. Explicitly, when the requested navigation direction is left and the left most character is visible, then step 604 determines if there is an adjacent word to the left of the current word. However, when the requested navigation direction is right and the right most character is visible, then step 604 determines if there is an adjacent word to the right of the current word. If the appropriate adjacent word does not exist, the boxed input corrector 180 does not scroll, and control goes to a step 608 which determines if the stylus 110 is still down thereby selecting the navigation arrow. However, if an appropriate adjacent word does exist, the selected word is set to the adjacent word. Then, step 608 determines if the user is still requesting motion, and, if so, control loops back to step 602. Otherwise, once navigation has been accomplished and no further requests are pending, the navigation method 598 is done.

FIG. 22 is a screen display illustrating a note area 151 having a paragraph of text 620 and a first selected word 164. Also displayed on the screen is a boxed input corrector 180 having a navigate left arrow 186 and a navigate right arrow 188. Note that the first selected word 164 has too many characters to be fully visible within the boxed input corrector 180. In accordance with one embodiment of the present invention, the first selected word 164 is left justified so that its left most character is visible. By selecting the navigate right arrow 188, a user may begin navigating the boxed input corrector 180 through the text paragraph 620.

FIG. 23 illustrates the screen display of FIG. 22 after the user has selected the navigate right arrow 188 once. Since the right most character of the first selected word was not initially visible, a step such as step 610 of FIG. 21 is performed such that the boxed input corrector 180 will scroll a meaningful string of characters in the desired navigation direction. In this embodiment, the characters of the first selected word 164 have been scrolled such that the characters of the first selected word 164 which were not visible in FIG. 22 are now visible within the boxed input corrector 180.

As shown in FIG. 23, the right most character of the first selected word 164 is now visible. Hence, selecting the navigate right arrow 188 causes the boxed input corrector 180 to navigate through the text paragraph 620 to the next available word. Accordingly, FIG. 24 shows a new selected word 164 highlighted on the note area 151 and displayed in the boxed input corrector 180. Finally, since the new selected word 164 is fully visible within the boxed input corrector 180, selecting the navigate left arrow 186 causes the boxed input corrector 180 to navigate back and select (once again) the first selected word 164. This is shown in FIG. 25. Note that the first selected word 164 is left justified so that its left most character is visible.

While this invention has been described in terms of several preferred embodiments, there are alterations, permutations, and equivalents which fall within the scope of this invention. It should also be noted that there are may alternative ways of implementing the processes of the present invention. For example, much of the programming can be simplified by using the high-level utilities and data structures mentioned in the preceeding specification. In particular, the described frame database system is preferred for simplifying the programming tasks required by the computer implemented processes of the present invention, but there are many other database and graphics systems which can be used to accomplish the same task.

It is therefore intended that the following appended claims be interpreted as including all such alterations, permutations, and equivalents as fall within the true spirit and scope of the present invention.

What is claimed is:

1. A computer implemented correction method for correcting words and characters entered into a pointer based computer system that includes a display screen for displaying a note area and a boxed input corrector, the correction method comprising the computer controlled steps of:

providing an electronic document capable of maintaining ink words and recognized words;

receiving a selected word from the electronic document including at least one character;

displaying the selected word within said boxed input corrector displayed on said display screen of the pointer based computer system, wherein when the selected word is an ink word, the ink word is displayed centered in said boxed input corrector within a single box, and, when the selected word is a string of one or more well defined characters, the selected word is arranged within the boxed input corrector such that each well defined character has a box associated therewith and when a given character of the selected word is displayed the given character is displayed within its associated box;

receiving a correction input; and performing an action indicated by the correction input wherein the action performed is determined by a type of the correction input, the types of correction inputs including character editing input, gesture input, navigation input, and external input generated by events external to the boxed input corrector, wherein types or navigation input include left and right direction commands, and when a left direction command is input, a left most character of the selected word displayed in the note area of the display is visible in the boxed input corrector part of display, and the selected word in the note area has an adjacent word located to the selected word's left, the step of performing the action includes the steps of receiving the adjacent word in the boxed input corrector for correction and changing the selected word in the note area to the adjacent word.

2. A computer implemented method as recited in claim 1 wherein when the selected word is the string of one or more well defined characters, an input field from which the selected word originated does not define a fixed format, and the selected word fits within a number of boxes which may simultaneously be displayed in the boxed input corrector, then the step of displaying the selected word includes displaying the selected word displayed in the note area centered within the boxed input corrector such that each character of the selected word displayed in the note area is visible in the boxed input corrector.

3. A computer implemented method as recited in claim 2 wherein when the selected word is the string of one or more well defined characters, the step of displaying the selected word further includes the steps of:

creating an empty alternates list for each box having an associated well defined character; and seeding each alternates list with both an upper case representation and a lower case representation of its associated well defined character.

4. A computer implemented method as recited in claim 1 wherein when the selected word is the string of one or more well defined characters, an input field from which the selected word originated does not define a fixed format, and the selected word does not fit within a number of boxes which may simultaneously be displayed in the boxed input corrector, then the step of displaying the selected word is performed such that a left most character of the selected word displayed in the note area is displayed in a left most box of the boxed input corrector.

5. A computer implemented method as recited in claim 1 wherein when the selected word is the string of one or more well defined characters, the step of displaying the selected word includes the steps of:

creating an empty alternates list for each box having an associated well defined character; and seeding each alternates list with both an upper case representation and a lower case representation of its associated well defined character.

6. A computer implemented method as recited in claim 1 wherein when the selected word is the string of one or more well defined characters and an input field from which the selected word originated defines a fixed format, the step of displaying the selected word includes the steps of:

displaying boxes according to the fixed format and centered within the boxed input corrector;

displaying the well defined characters of the selected word displayed in the note area appropriately within their associated boxes according to the fixed format; and providing a visual indication of which boxes contain modifiable characters.

7. A computer implemented method as recited in claim 1 wherein the fixed format is selected from the group of fixed formats including time format, date format, telephone number format, social security number format, and currency format.

8. A computer implemented method as recited in claim 1 wherein when the selected word is the string of one or more well defined characters and the correction input is a character editing input overwriting a given box, the step of performing the indicated action includes the steps of:

receiving a ranked character list of one or more well defined characters corresponding to possible characters which the character editing input may represent;

reordering the ranked character list based on a format of the boxed input corrector and a guess list of characters which the box input corrector has previously suggested for the given box;

removing any characters from the ranked character list which are not suitable for the given box; and replacing a current character associated with the given box with a highest ranked character found in the ranked character list.

9. A computer implemented method as recited in claim 8 wherein when the given box is a right most visible box, the step of performing the indicated action further includes the step of shifting the boxes such that a next suitable string of characters will display in the boxed input corrector properly.

10. A computer implemented method as recited in claim 1 wherein when the correction input is a scrub gesture input and the selected word is the ink word, the step of performing the action includes the step of deleting the ink word.

11. A computer implemented method as recited in claim 1 wherein when the correction input is a scrub gesture input and the selected word is the string of one or more well defined characters, the step of performing the action includes the steps of:

determining a bounds of the scrub gesture input;

determining the boxes which the bounds of the scrub gesture input overlap;

selecting each character which is fully covered by the bounds of the scrub gesture input; and when the bounds of the scrub gesture input do not fully cover at least one character, determining if the scrub gesture input is a single character scrub gesture, and, if so, selecting a single character which the bounds of the scrub gesture input overlap.

12. A computer implemented method as recited in claim 11 wherein when the selected word is displayed in a fixed format in the note area, the step of performing the action further includes the step of clearing each box associated with a selected character.

13. A computer implemented method as recited in claim 11 wherein when the selected word is not displayed in a fixed format in the note area and the selected characters are either (a) only spaces before the selected word or (b) only spaces after the selected word, the step of performing the action further includes the step of deleting the spaces such that the selected word is joined to an appropriate adjacent word.

14. A computer implemented method as recited in claim 11 wherein when the selected word is not displayed in a fixed format in the note area and the selected characters are neither (a) only spaces before the selected word nor (b) only spaces after the selected word, the step of performing the action further includes the step of deleting the selected characters.

15. A computer implemented method as recited in claim 1 wherein when the correction input is an insert gesture input and the selected word is the ink word, the step of performing the action includes the steps of:

forming two new ink words by splitting the ink word at an input position of the insert gesture input; and setting the selected word to a one of the two new ink words.

16. A computer implemented method as recited in claim 1 wherein when the correction input is an insert gesture input, the selected word is the string of one or more well defined characters, and the selected word is not displayed in a fixed format in the note area, the step of performing the action includes the step of adding a space character at an input position of the insert gesture input.

17. A computer implemented method as recited in claim 1 wherein when the correction input is an insert gesture input, the selected word is the string of one or more well defined characters, and the selected word is displayed in a fixed format in the note area, the step of performing the action includes the step of ignoring the insert gesture.

18. A computer implemented method as recited in claim 1 wherein when the correction input is a tap gesture input selecting a box from within the boxed input corrector, the step of performing the action includes the step of creating an empty pop-up menu list for use in storing correction actions which may be performed on the selected word in the note area and the selected character in the boxed input corrector.

19. A computer implemented method as recited in claim 18 wherein when the correction input is the tap gesture input and the selected word is the ink word, the step of performing the action further includes the steps of:

adding a recognize command and a delete command to the pop-up menu list;

when a second word adjacent to the selected word is also an adjacent ink word, adding a corresponding join word command to the pop-up menu list;

displaying a pop-up menu having the commands in the pop-up menu list as commands available for selection; and receiving a command selection chosen from the pop-up menu.

20. A computer implemented method as recited in claim 1 wherein when the correction input is a tap gesture input and the selected word is the string of one or more well defined characters, the step of performing the action includes the steps of:

when the selected box contains a character, adding an alternate characters list as items in the pop-up menu list;

when the selected box contains a space character, adding appropriate punctuation characters to the pop-up menu list;

when the selected word has a fixed format, adding a "clear character" command to the pop-up menu list;

when the selected word does not have a fixed format, adding both a "delete character" and an "add word" command to the pop-up menu list;

when the selected box contains a space character located at an end of the selected word, adding an "add word" command to the pop-up menu list;

displaying a pop-up menu having the commands in the pop-up menu list as commands available for selection; and receiving a command selection chosen from the pop-up menu.

21. A computer implemented method as recited in claim 1 wherein when the requested navigation direction is left and a left most character of the selected word in the note area is not visible in the boxed input corrector, the step of performing the action further includes the step of scrolling a meaningful string of characters.

22. A computer implemented method as recited in claim 1 wherein when the requested navigation direction is right, a right most character of the selected word displayed in the note area of the display is visible in the boxed input corrector part of the display, and the selected word in the note area has an adjacent word located to the selected word's right, the step of performing the action further includes the steps of receiving the adjacent word located to the selected word's right in the boxed input corrector for correction and changing the selected word in the note area to the adjacent word located to the selected word's right.

23. A computer readable medium storing a computer program for correcting words and characters entered via a pointer based computer system that includes a display screen for displaying a note area and a boxed input corrector into an electronic document capable of maintaining ink words and recognized words, the computer program comprising the programming instructions for:

receiving a selected word from the electronic document including at least one character;

displaying the selected word within said boxed input corrector displayed on said display screen of the pointer based computer system, wherein when the selected word is an ink word, the ink word is displayed centered in said boxed input corrector within a single box, and, when the selected word is a string of one or more well defined characters, the selected word is arranged within the boxed input corrector such that each well defined character has a box associated therewith and when a given character of the selected word is displayed the given character is displayed within its associated box;

receiving a correction input; and performing an action indicated by the correction input wherein the action performed is determined by a type of the correction input, the types of correction inputs including character editing input, gesture input, navigation input, and external input generated by events external to the boxed input corrector, wherein types of navigation input include left and right direction commands, and when a left direction command is input, a left most character of the selected word displayed in the note area of the display is visible in the boxed input corrector part of display, and the selected word in the note area has an adjacent word located to the selected word's left, the step of performing the action includes the steps of receiving the adjacent word in the boxed input corrector for correction and changing the selected word in the note area to the adjacent word.

24. A boxed input correction system for navigating and correcting an electronic document capable of maintaining both ink words and recognized words, the boxed input correction system comprising:

a pen-based computer system including a central processing unit, memory accessible by the central processing unit, and a dual-function display system having a display screen for displaying a note area and a boxed input corrector; and a boxed input corrector implemented on the pen-based computer system which receives and displays a selected word from the electronic document, receives a correction input indicating an action to be performed on the selected word, and performs the action, the correction input including navigation type left and right direction commands, and when the correction input is a left direction command, a left most character of the selected word displayed in the note area of the display is displayed in the boxed input corrector part of the display, and an adjacent word located to the left of the selected word on the note area exists, the performed action includes the steps of receiving the adjacent word in the boxed input corrector for correction and changing the selected word in the note area to the adjacent word, wherein when the selected word is an ink word, the boxed input corrector displays the ink word centered within a single box and, when the selected word is a string of one or more well defined characters, the boxed input corrector displays the selected word such that each well defined character has a box associated therewith and when a given character of the selected word is displayed the given character is displayed within its associated box.

25. A boxed input correction system as recited in claim 24 wherein the boxed input corrector is operative such that when the selected word is the string of one or more well defined characters, an input field from which the selected word originated does not define a fixed format, and the selected word fits within a number of boxes which may simultaneously be displayed on the display screen, the selected word in the note area is displayed centered within the boxed input corrector such that each character of the selected word in the note area is visible in the boxed input corrector.

26. A boxed input correction system as recited in claim 25 wherein the boxed input corrector is further operative to create an alternates list for each box having an associated character, the alternates list having an upper case representation and a lower case representation of its associated well defined character.

27. A boxed input correction system as recited in claim 24 wherein the boxed input corrector is operative such that when the selected word is the string of one or more well defined characters, an input field from which the selected word originated does not define a fixed format, and the selected word does not fit within a number of boxes which may simultaneously be displayed on the display screen, the selected word in the note area is displayed within the boxed input corrector such that a left most character of the selected word in the note area is displayed in a left most box of the boxed input corrector.

28. A boxed input correction system as recited in claim 24 wherein the boxed input corrector is operative such that when the selected word is the string of one or more well defined characters and an input field from which the selected word originated defines a fixed format, the boxes are displayed according to the fixed format and centered within the boxed input corrector, the well defined characters of the selected word in the note area are displayed appropriately within their associated boxes according to the fixed format, and the boxed input corrector provides a visual indication of which boxes contain modifiable characters.

29. A boxed input correction system as recited in claim 24 wherein the boxed input corrector is operative such that when the selected word is the string of one or more well defined characters and the correction input is a character editing input overwriting a given box, the boxed input corrector receives a ranked character list of one or more well defined characters corresponding to possible characters which the character editing input may represent, reorders the ranked character list based on a format of the boxed input corrector and a guess list of characters which the box input corrector has previously suggested for the given box, removes any characters from the ranked character list which are not suitable for the given box, and replaces a current character associated with the given box with a highest ranked character found in the ranked character list.

30. A boxed input correction system as recited in claim 24 wherein the boxed input corrector is operative such that when the correction input is a scrub gesture input and the selected word in the note area is the ink word, the boxed input corrector deletes the ink word.

31. A boxed input correction system as recited in claim 24 wherein the boxed input corrector is operative such that when the correction input is a scrub gesture input and the selected word is the string of one or more well defined characters, the boxed input corrector determines the bounds of the scrub gesture input, determines the boxes which the bounds of the scrub gesture input overlap, selects each character which is fully covered by the bounds of the scrub gesture input, and, when the bounds of the scrub gesture input do not fully cover at least one character, determines if the scrub gesture input is a single character scrub gesture, and, if so, selects a single character which the bounds of the scrub gesture input overlap.

32. A boxed input correction system as recited in claim 31 wherein the boxed input corrector is operative such that when the selected word is displayed in a fixed format in the note area, the boxed input corrector clears each box associated with a selected character in the boxed input corrector.

33. A boxed input correction system as recited in claim 24 wherein the boxed input corrector is operative such that when the correction input is an insert gesture input and the selected word is the ink word, the boxed input corrector forms two new ink words by splitting the ink word at an input position of the insert gesture input and sets the selected word to a one of the two new ink words.

34. A boxed input correction system as recited in claim 24 wherein the boxed input corrector is operative such that when the correction input is an insert gesture input, the selected word is the string of one or more well defined characters, and the selected word is not displayed in a fixed format in the note area, the boxed input corrector adds a space character at an input position of the insert gesture input.

35. A boxed input correction system as recited in claim 24 wherein the boxed input corrector is operative such that when the selected word is displayed in a fixed format in the note area, the boxed input corrector ignores insert gesture inputs.

36. A boxed input correction system as recited in claim 24 wherein the boxed input corrector is operative such that when the correction input is a tap gesture input selecting a box from within the boxed input corrector, the boxed input corrector creates an empty pop-up menu list for use in storing correction actions which may be performed on the selected word in the note area and the selected character in the boxed input corrector.

37. A boxed input correction system as recited in claim 36 wherein the boxed input corrector is further operative such that when the correction input is the tap gesture input and the selected word is the ink word, the boxed input corrector adds a recognize command and a delete command to the pop-up menu list, displays a pop-up menu having the commands in the pop-up menu list as commands available for selection, and receives a command selected from the pop-up menu.

38. A boxed input correction system as recited in claim 24 wherein the boxed input corrector is further operative such that when the requested navigation direction is left and a left most character of the selected word in the note area is not visible in the boxed input corrector, the boxed input corrector scrolls a meaningful string of characters to the right.

* * * * *